United States Patent
Sasaki et al.

(10) Patent No.: US 10,310,587 B2
(45) Date of Patent: Jun. 4, 2019

(54) POWER-SUPPLY CONTROL APPARATUS, POWER-SUPPLY CONTROL METHOD, SERVER, POWER-SUPPLY CONTROL SYSTEM, AND STORAGE MEDIUM

(71) Applicants: FUJITSU LIMITED, Kawasaki-shi, Kanagawa (JP); The University of Tokyo, Bunkyo-ku, Tokyo (JP)

(72) Inventors: Tomotake Sasaki, Kawasaki (JP); Hitoshi Yanami, Kawasaki (JP); Junji Kaneko, Mishima (JP); Shinji Hara, Tokyo (JP)

(73) Assignees: FUJITSU LIMITED, Kawasaki (JP); THE UNIVERSITY OF TOKYO, Tokyo (JP)

( * ) Notice: Subject to any disclaimer, the term of this patent is extended or adjusted under 35 U.S.C. 154(b) by 43 days.

(21) Appl. No.: 14/922,439

(22) Filed: Oct. 26, 2015

(65) Prior Publication Data

US 2016/0154453 A1 Jun. 2, 2016

(30) Foreign Application Priority Data

Nov. 28, 2014 (JP) .................... 2014-241371

(51) Int. Cl.
G06F 1/32 (2019.01)
G06F 1/3287 (2019.01)
G06F 1/3212 (2019.01)

(52) U.S. Cl.
CPC .......... *G06F 1/3287* (2013.01); *G06F 1/3212* (2013.01); *Y02D 10/171* (2018.01); *Y02D 10/174* (2018.01)

(58) Field of Classification Search
None
See application file for complete search history.

(56) References Cited

U.S. PATENT DOCUMENTS 6,347,254 B1 2/2002 Lu
2009/0094473 A1* 4/2009 Mizutani ............... G06F 1/3203
713/340

(Continued)

FOREIGN PATENT DOCUMENTS

JP 11-275762 10/1999
JP 2002-534729 10/2002

(Continued)

OTHER PUBLICATIONS

Espacenet Abstract, Publication No. JP 11-275762, Published Oct. 8, 1999.

(Continued)

*Primary Examiner* — Jaweed A Abbaszadeh
*Assistant Examiner* — Cheri L Harrington
(74) *Attorney, Agent, or Firm* — Staas & Halsey LLP

(57) ABSTRACT

A power-supply control apparatus includes a processor that executes a process. The process includes calculating, for a first time period, a first predictive value of total power consumption by the power-supply control apparatus and one or more other power-supply control apparatuses to which power is supplied from a power supply; and determining whether to allow a storage battery to be charged in the first time period based on the first predictive value for the first time period and previous information that is related to the first predictive value and obtained in a second time period before the first time period.

11 Claims, 15 Drawing Sheets

(56) References Cited

U.S. PATENT DOCUMENTS

| | | | |
|---|---|---|---|
| 2013/0049468 A1* | 2/2013 | Iwasaki | H02J 7/35 307/48 |
| 2013/0300374 A1* | 11/2013 | Tomita | H01M 10/441 320/134 |
| 2014/0249793 A1 | 9/2014 | Yanami et al. | |
| 2014/0371933 A1* | 12/2014 | Iwamura | G06F 1/3209 700/291 |
| 2015/0317589 A1* | 11/2015 | Anderson | G06Q 10/08 705/7.25 |
| 2015/0333512 A1* | 11/2015 | Saussele | H02S 10/20 700/287 |
| 2016/0003918 A1* | 1/2016 | Wada | H02J 3/32 320/134 |
| 2016/0156188 A1* | 6/2016 | Baba | G05B 15/02 700/296 |
| 2016/0157180 A1* | 6/2016 | Brown | H04W 52/0261 455/574 |
| 2016/0193931 A1* | 7/2016 | Adachi | H02J 3/32 307/10.1 |

FOREIGN PATENT DOCUMENTS

| | | |
|---|---|---|
| JP | 2013-106372 | 5/2013 |
| JP | 2014-171330 | 9/2014 |
| JP | 2014-195363 | 10/2014 |

OTHER PUBLICATIONS

Abstract of PCT Patent Publication No. WO 00/41044 A1, Published Jul. 13, 2000.

Abstract of Japanese Patent Publication No. 2013-106372, Published May 30, 2013.

Espacenet Abstract, Publication No. JP 2014-171330, Published Sep. 18, 2014.

Espacenet Abstract, Publication No. JP 2014-195363, Published Oct. 9, 2014.

M. Nagahara et al., "Packetized Predictive Control and Sparse Representation for Networked Control," *Proceedings of 41st Symposium on Control Theory*, Sep. 18, 2012, pp. 131-134.

\* cited by examiner

FIG.2A
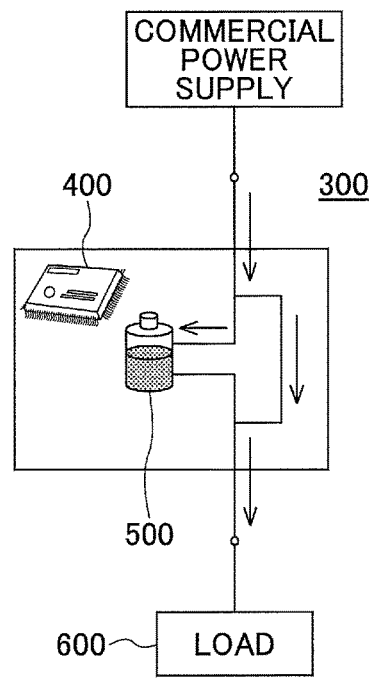
FIG.2B        FIG.2C        FIG.2D
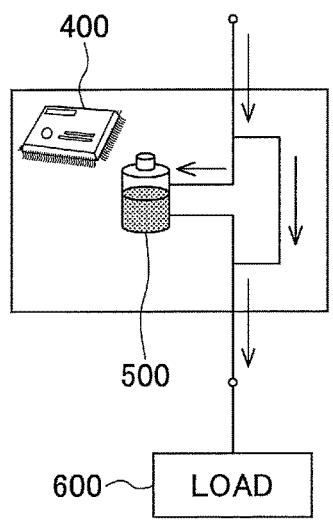 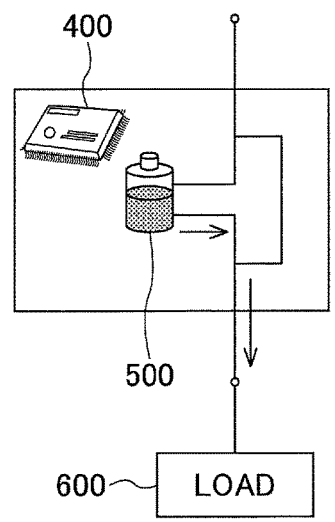 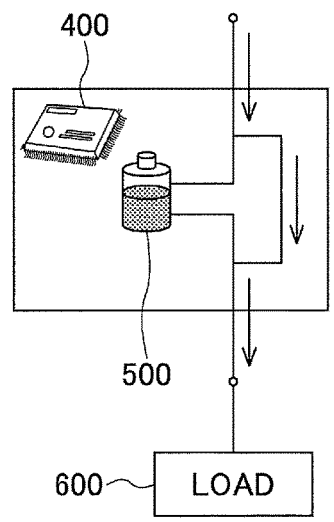

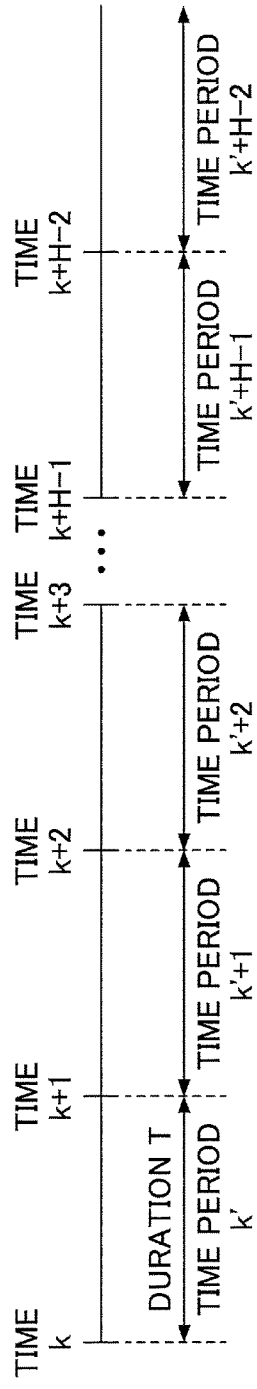

| OBTAINED TIME | CHARGE-AND-DISCHARGE PLAN | TOTAL INCREASE | TOTAL DECREASE |
|---|---|---|---|
| k | CHARGE-AND-DISCHARGE PLAN $S_1[k'|k]$ FOR TIME PERIOD $k'$ | $\sigma c[k'|k]$ | $\sigma d[k'|k]$ |
|  | CHARGE-AND-DISCHARGE PLAN $S_1[k'+1|k]$ FOR TIME PERIOD $k'+1$ | $\sigma c[k'+1|k]$ | $\sigma d[k'+1|k]$ |
|  | CHARGE-AND-DISCHARGE PLAN $S_1[k'+2|k]$ FOR TIME PERIOD $k'+2$ | $\sigma c[k'+2|k]$ | $\sigma d[k'+2|k]$ |
| k+1 | CHARGE-AND-DISCHARGE PLAN $S_1[k'+1|k+1]$ FOR TIME PERIOD $k'+1$ | $\sigma c[k'+1|k+1]$ | $\sigma d[k'+1|k+1]$ |
|  | CHARGE-AND-DISCHARGE PLAN $S_1[k'+2|k+1]$ FOR TIME PERIOD $k'+2$ | $\sigma c[k'+2|k+1]$ | $\sigma d[k'+2|k+1]$ |
|  | CHARGE-AND-DISCHARGE PLAN $S_1[k'+3|k+1]$ FOR TIME PERIOD $k'+3$ | $\sigma c[k'+3|k+1]$ | $\sigma d[k'+3|k+1]$ |
| ... |  | ... | ... |

| TIME | OPERATION |
|---|---|
| FROM TIME k TO TIME k+a | CHARGING |
| FROM TIME k+a TO TIME k+1 | BYPASS |

CHARGE-AND-DISCHARGE PLAN $S_1[k'|k]$

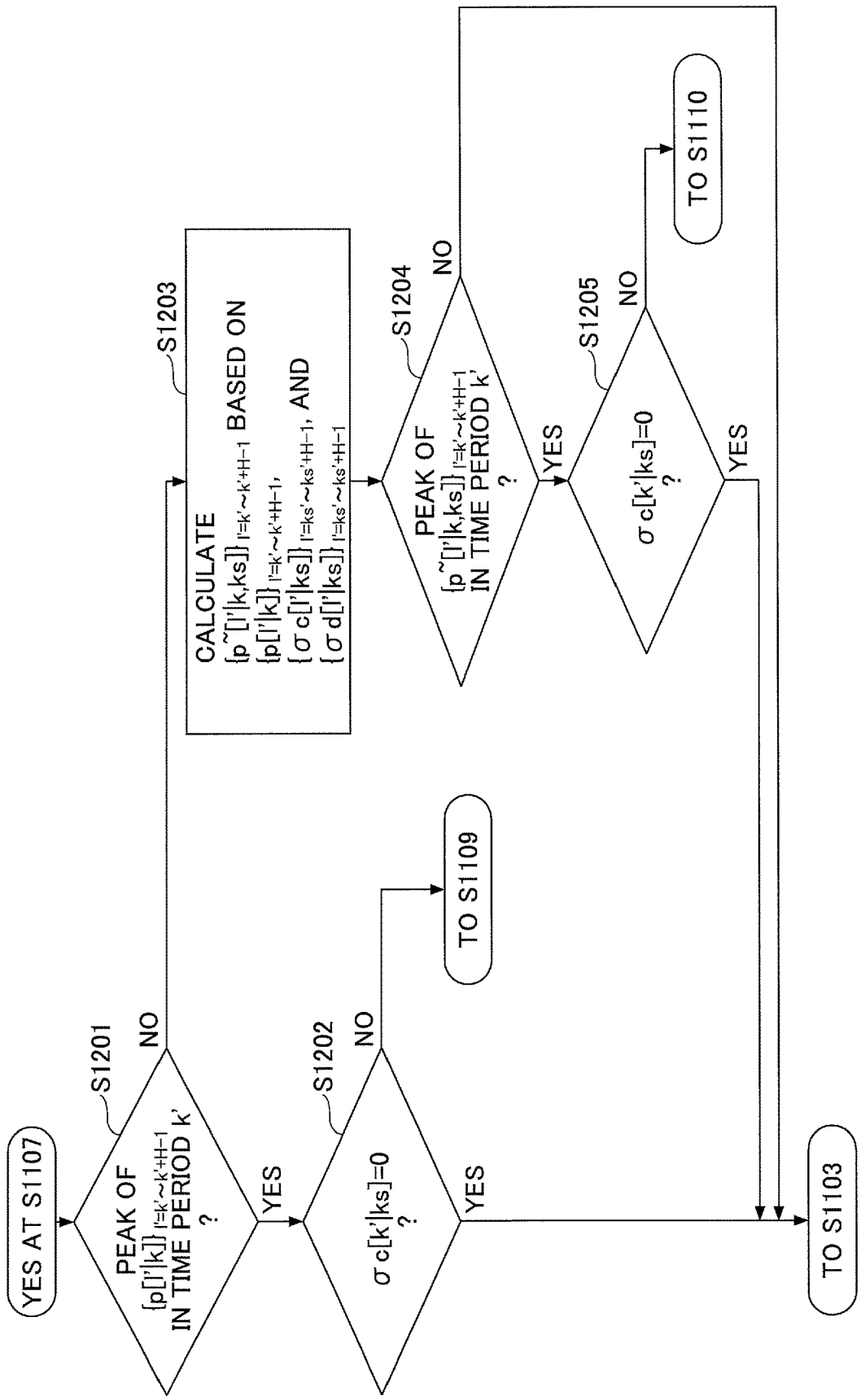

PREDICTIVE POWER
CONSUMPTION VALUE
(CALCULATED AT TIME ks)
+ CHARGE-AND-DISCHARGE
PLAN

▧ PREDICTIVE POWER
CONSUMPTION VALUE

CHARGE-AND-DISCHARGE PLAN FOR TIME PERIOD k'
(GENERATED AT TIME ks)

| TIME | OPERATION |
|---|---|
| FROM TIME k TO TIME k+a | CHARGING |
| FROM TIME k+a TO TIME k+1 | BYPASS |

CHARGE-AND-DISCHARGE PLAN FOR TIME PERIOD k'
(CORRECTED AT TIME k)

| TIME | OPERATION |
|---|---|
| FROM TIME k TO TIME k+a | BYPASS |
| FROM TIME k+a TO TIME k+1 | BYPASS |

US 10,310,587 B2

POWER-SUPPLY CONTROL APPARATUS, POWER-SUPPLY CONTROL METHOD, SERVER, POWER-SUPPLY CONTROL SYSTEM, AND STORAGE MEDIUM

CROSS-REFERENCE TO RELATED APPLICATION

This application is based upon and claims the benefit of priority of Japanese Patent Application No. 2014-241371 filed on Nov. 28, 2014, the entire contents of which are incorporated herein by reference.

FIELD

An aspect of this disclosure relates to a power-supply control apparatus, a power-supply control method, a server, a power-supply control system, and a storage medium.

BACKGROUND

There exist technologies for reducing peak power indicating maximum power consumption to achieve stable power supply by using storage batteries provided for respective communities such as buildings, homes, and municipalities.

For example, there exists a technology where a server generates optimum charge-and-discharge plans for respective storage batteries and delivers the charge-and-discharge plans to control apparatuses for controlling charging and discharging of the storage batteries (see, for example, Japanese Laid-Open Patent Publication No. 2014-195363 and Japanese Laid-Open Patent Publication No. 2014-171330). As another example, there exists a technology where a charge-and-discharge plan covering multiple time periods is delivered for each storage battery and stored in a memory of a receiving end so that the charge-and-discharge plan stored in the memory can be used when the latest charge-and-discharge plan is not delivered (see, for example, Nagahara, Quevedo, Ostergaard, "Packetized Predictive Control and Sparse Representation for Networked Control", Proceedings of 41st Symposium on Control Theory, pp. 131-134, 2012).

SUMMARY

According to an aspect of this disclosure, there is provided a power-supply control apparatus including a processor that executes a process. The process includes calculating, for a first time period, a first predictive value of total power consumption by the power-supply control apparatus and one or more other power-supply control apparatuses to which power is supplied from a power supply; and determining whether to allow a storage battery to be charged in the first time period based on the first predictive value for the first time period and previous information that is related to the first predictive value and obtained in a second time period before the first time period.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 2A through 2D are drawings illustrating an exemplary storage battery system;

FIG. 6 is a drawing illustrating time periods;

FIG. 7 is a table illustrating exemplary charge-and-discharge plans and additional information;

FIG. 12 is another flowchart illustrating an exemplary process performed by a power-supply control apparatus;

DESCRIPTION OF EMBODIMENTS

In the related-art technology described above, the charge-and-discharge plan stored in the memory is not the latest charge-and-discharge plan. Therefore, if the current power usage status is different from the power usage status at the time when the charge-and-discharge plan was generated, executing the charge-and-discharge plan stored in the memory may increase peak power or cause a new peak.

An aspect of this disclosure makes it possible to provide a power-supply control apparatus, a power-supply control method, a server, a power-supply control system, and a storage medium that can reliably control a power supply.

Figure 1:
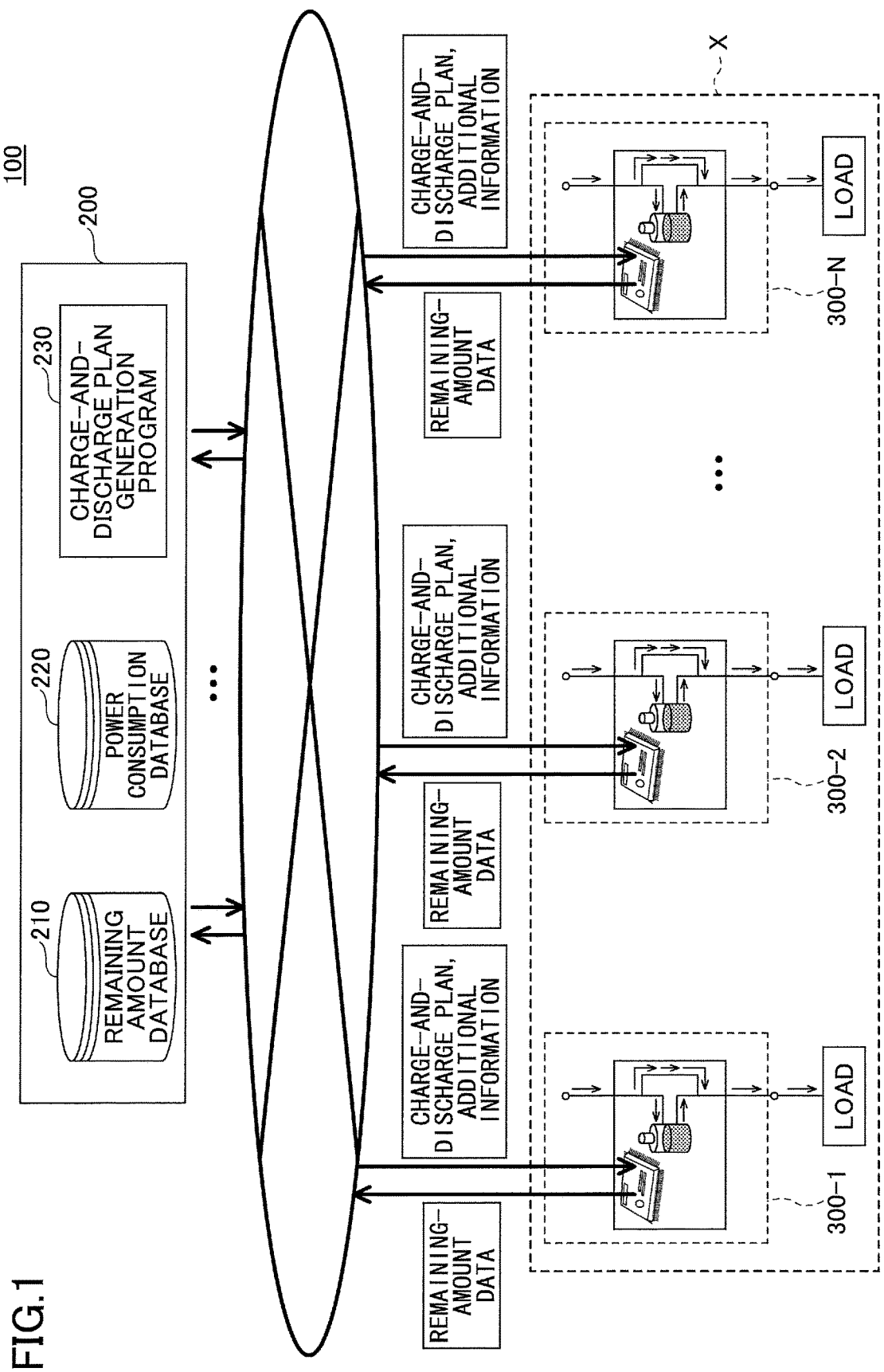
FIG. 1 is a drawing illustrating an exemplary power-supply control system.

Embodiments of the present invention are described below with reference to the accompanying drawings. FIG. 1 is a drawing illustrating an exemplary power-supply control system 100 according to an embodiment.

The power-supply control system 100 may include a delivery server 200 and multiple storage battery systems 300-1, 300-2, . . . , and 300-N. The delivery server 200 and the storage battery systems 300-1, 300-2, . . . , and 300-N are connected to each other via, for example, a network.

The delivery server 200 may include a remaining amount database 210 and a power consumption database 220. Also, a charge-and-discharge plan generation program 230 is installed in the delivery server 200. The delivery server 200 generates charge-and-discharge plans for storage batteries of the storage battery systems 300-1, 300-2, . . . , and 300-N based on predictive values of power consumption (or energy consumption) and power usage status obtained by referring to the remaining amount database 210 and the power consumption database 220, and delivers the charge-and-discharge plans to the storage battery systems 300-1, 300-2, . . . , and 300-N. In the present embodiment, "power consumption" indicates the total amount of power (or energy) supplied to the entire community including the storage battery systems 300-1, 300-2, . . . , and 300-N.

Also, the delivery server 200 attaches additional information to each of the charge-and-discharge plans to be delivered to the storage battery systems 300-1, 300-2, ..., and 300-N. The additional information indicates a variation in the power consumption that is expected when the charge-and-discharge plans are executed. Details of the charge-and-discharge plan and the additional information are described later.

According to the present embodiment, the storage battery systems 300-1, 300-2, ..., and 300-N are installed, for example, in an office X and each of which is connected to a load such as a personal computer that consumes power. Thus, in the present embodiment, the power consumption may indicate a total amount of power (or energy) supplied from a commercial power supply to the office X.

Each of the storage battery systems 300-1, 300-2, ..., and 300-N includes a storage battery for supplying power to the load and a power-supply control apparatus for controlling charging and discharging of the storage battery. In the descriptions below, the storage battery systems 300-1, 300-2, ..., and 300-N may be simply referred to as a "storage battery system 300" or "storage battery systems 300" when it is not necessary to distinguish them.

The storage battery system 300 of the present embodiment sends, to the delivery server 200, remaining-amount data indicating the remaining amount of charge of the storage battery. The remaining-amount data is stored in the remaining amount database 210 of the delivery server 200.

The power-supply control apparatus of the present embodiment includes a power-supply control program installed therein, and controls charging and discharging of the storage battery according to a delivered charge-and-discharge plan. Also, when the latest charge-and-discharge plan and additional information are not delivered, the power-supply control apparatus obtains a predictive value of power consumption that is predicted when charging and discharging are performed by the storage battery systems 300 based on previously-delivered charge-and-discharge plans and additional information, and controls the state of the storage battery based on the obtained predictive value.

Thus, the present embodiment makes it possible to reliably control a power supply for supplying power to a load even when the latest charge-and-discharge plan is not delivered from the delivery server 200.

The storage battery system 300 is described below with reference to FIGS. 2A through 2D.

FIGS. 2A through 2D are drawings illustrating the storage battery system 300. FIG. 2A illustrates the storage battery system 300, and FIGS. 2B through 2D are used to describe operations of the storage battery system 300.

As illustrated by FIG. 2A, the storage battery system 300 includes a power-supply control apparatus 400 and a storage battery 500, and is connected to a load 600. The load 600 may be a single apparatus or a collection of apparatuses.

The power-supply control apparatus 400 controls charging and discharging of the storage battery 500 based on a charge-and-discharge plan delivered from the delivery server 200. The storage battery 500 supplies power to the load 600. When, for example, the storage battery system 300 is a notebook personal computer, the storage battery 500 is a battery of the notebook personal computer.

The power-supply control apparatus 400 performs control operations as illustrated by FIGS. 2B through 2D.

FIG. 2B illustrates an operation where the storage battery 500 is charged. The power-supply control apparatus 400 connects the storage battery 500 to a commercial power supply, and charges the storage battery 500 with power supplied from the commercial power supply. During this operation, power is supplied from the commercial power supply to the load 600. Accordingly, the power consumption of the storage battery system 300 in the operation of FIG. 2B is a sum of power supplied from the commercial power supply to the storage battery 500 and power supplied from the commercial power supply to the load 600. In the present embodiment, the operation of FIG. 2B is referred to as a "charging operation" of the storage battery 500.

FIG. 2C illustrates an operation where the storage battery 500 discharges electricity. The power-supply control apparatus 400 disconnects the storage battery 500 from the commercial power supply, and connects the storage battery 500 to the load 600. As a result, power is supplied from the storage battery 500 to the load 600. Accordingly, during the operation of FIG. 2C, power is not supplied from the commercial power supply to the load 600 of the storage battery system 300. In the present embodiment, the operation of FIG. 2C is referred to as a "discharging operation" of the storage battery 500.

FIG. 2D illustrates an operation where the storage battery 500 is neither charged nor discharged. The power-supply control apparatus 400 connects the load 600 to the commercial power supply, and disconnects the storage battery 500 from the commercial power supply and the load 600. In this case, power is supplied from the commercial power supply to the load 600. Accordingly, the power consumption of the storage battery system 300 in the operation of FIG. 2D equals the amount of power supplied to the load 600. In the present embodiment, the operation of FIG. 2D is referred to as a "bypass operation".

Figure 3:
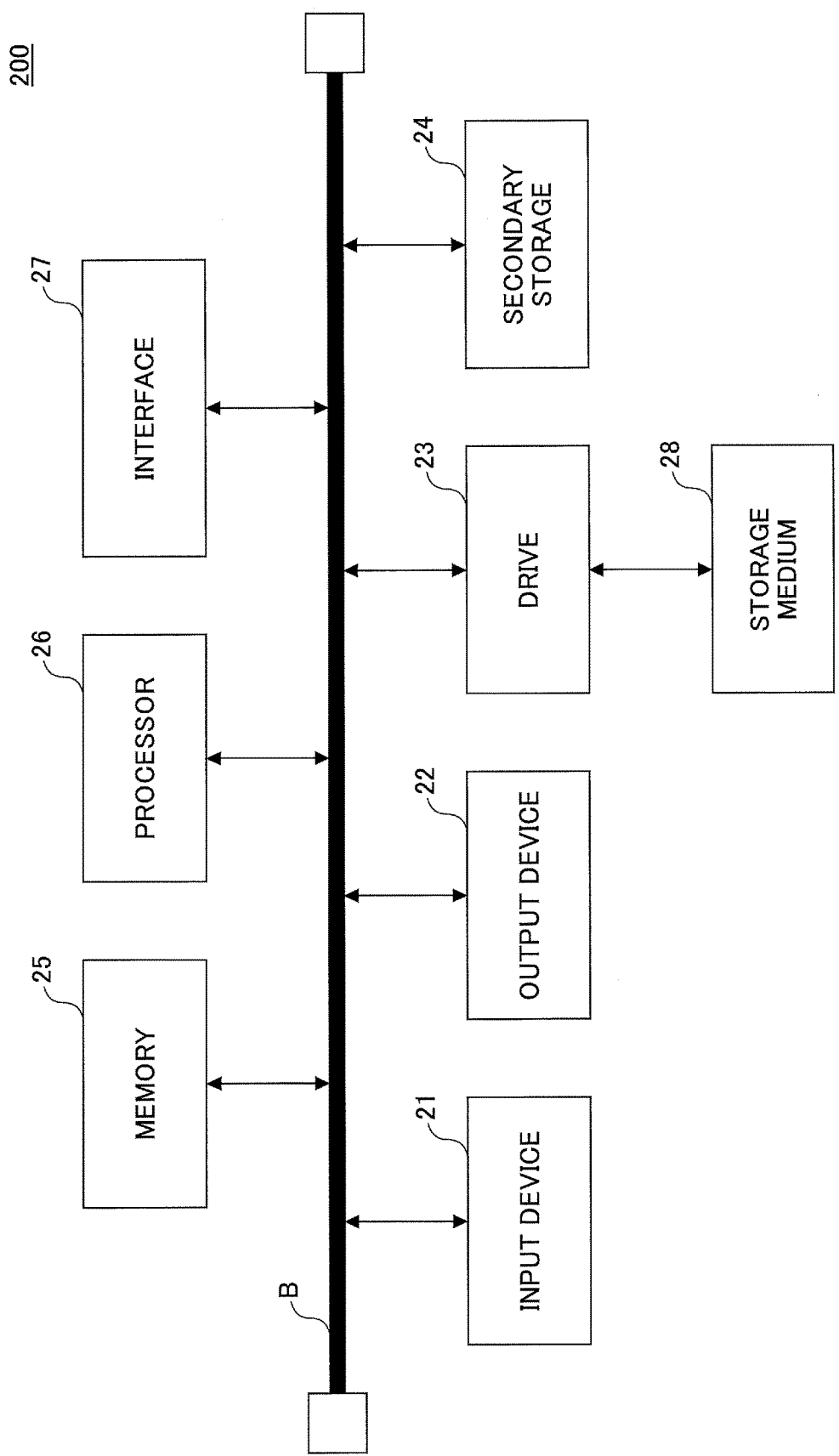
FIG. 3 is a block diagram illustrating an exemplary hardware configuration of a delivery server.

Next, an exemplary hardware configuration of the power-supply control system 100 of the present embodiment is described. FIG. 3 is a block diagram illustrating an exemplary hardware configuration of the delivery server 200.

The delivery server 200 is a computer including an input device 21, an output device 22, a drive 23, a secondary storage 24, a memory 25, a processor 26, and an interface 27 that are connected to each other via a bus B.

The input device 21 includes, for example, a keyboard and a mouse, and is used to input instructions (or operation signals). The output device 22 includes, for example, a display, and is used to display various windows and data. The interface 27 includes, for example, a modem and a LAN card, and is used to connect the delivery server 200 to a network.

The charge-and-discharge plan generation program 230 is at least a part of various programs for controlling the delivery server 200. For example, the charge-and-discharge plan generation program 230 may be provided via a storage medium 28 or downloaded from a network. Examples of the storage medium 28 for storing the charge-and-discharge plan generation program 230 include storage media such as a compact disk read-only memory (CD-ROM), a flexible disk, and a magneto-optical disk that record information optically, electrically, or magnetically; and semiconductor memories such as a read-only memory (ROM) and a flash memory that record information electrically.

When the storage medium 28 storing the charge-and-discharge plan generation program 230 is mounted on the drive 23, the charge-and-discharge plan generation program 230 is read by the drive 23 from the storage medium 28 and installed in the secondary storage 24. On the other hand, when the charge-and-discharge plan generation program 230 is downloaded from a network, the charge-and-discharge plan generation program 230 is installed via the interface 27 in the secondary storage 24.

The secondary storage 24 stores the installed charge-and-discharge plan generation program 230 and other necessary files and data. The memory 25 stores the charge-and-discharge plan generation program 230 read from the secondary storage 24 when the computer is started. The processor 26 executes the charge-and-discharge plan generation program 230 stored in the memory 25 to perform various processes described later.

Figure 4:
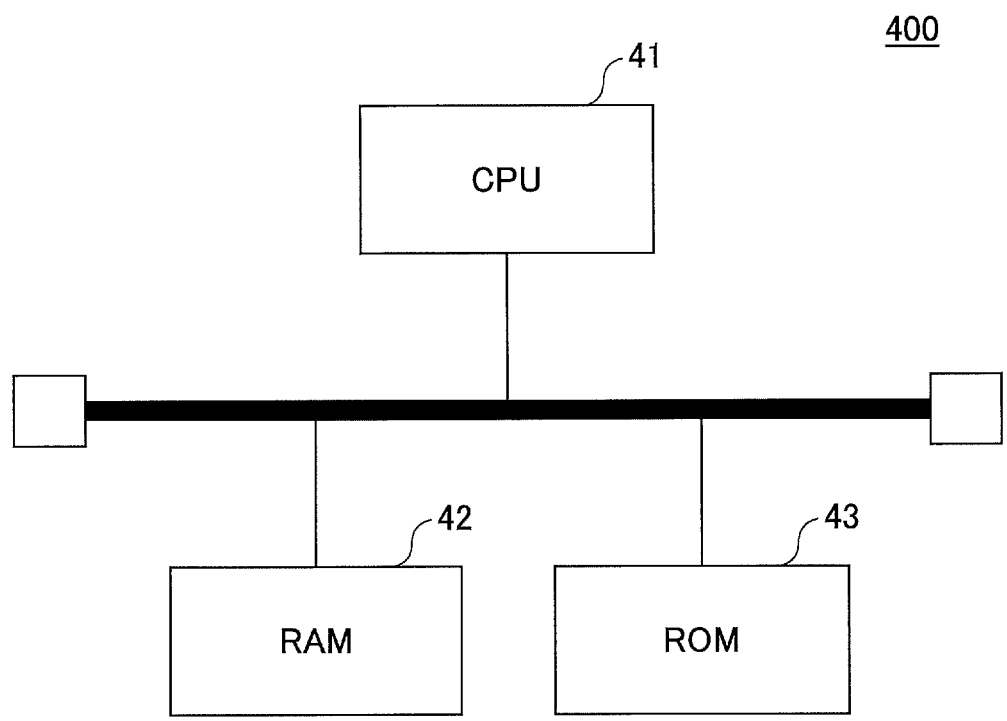
FIG. 4 is a block diagram illustrating an exemplary hardware configuration of a power-supply control apparatus.

FIG. 4 is a block diagram illustrating an exemplary hardware configuration of the power-supply control apparatus 400. The power-supply control apparatus 400 includes a central processing unit (CPU) 41, a random access memory (RAM) 42, and a read-only memory (ROM) 43. The ROM 43 stores a power-supply control program. The RAM 42 stores various values necessary for calculations performed by the CPU 41. The CPU 41 executes the power-supply control program to implement functions of the power-supply control apparatus 400 described later.

Figure 5:
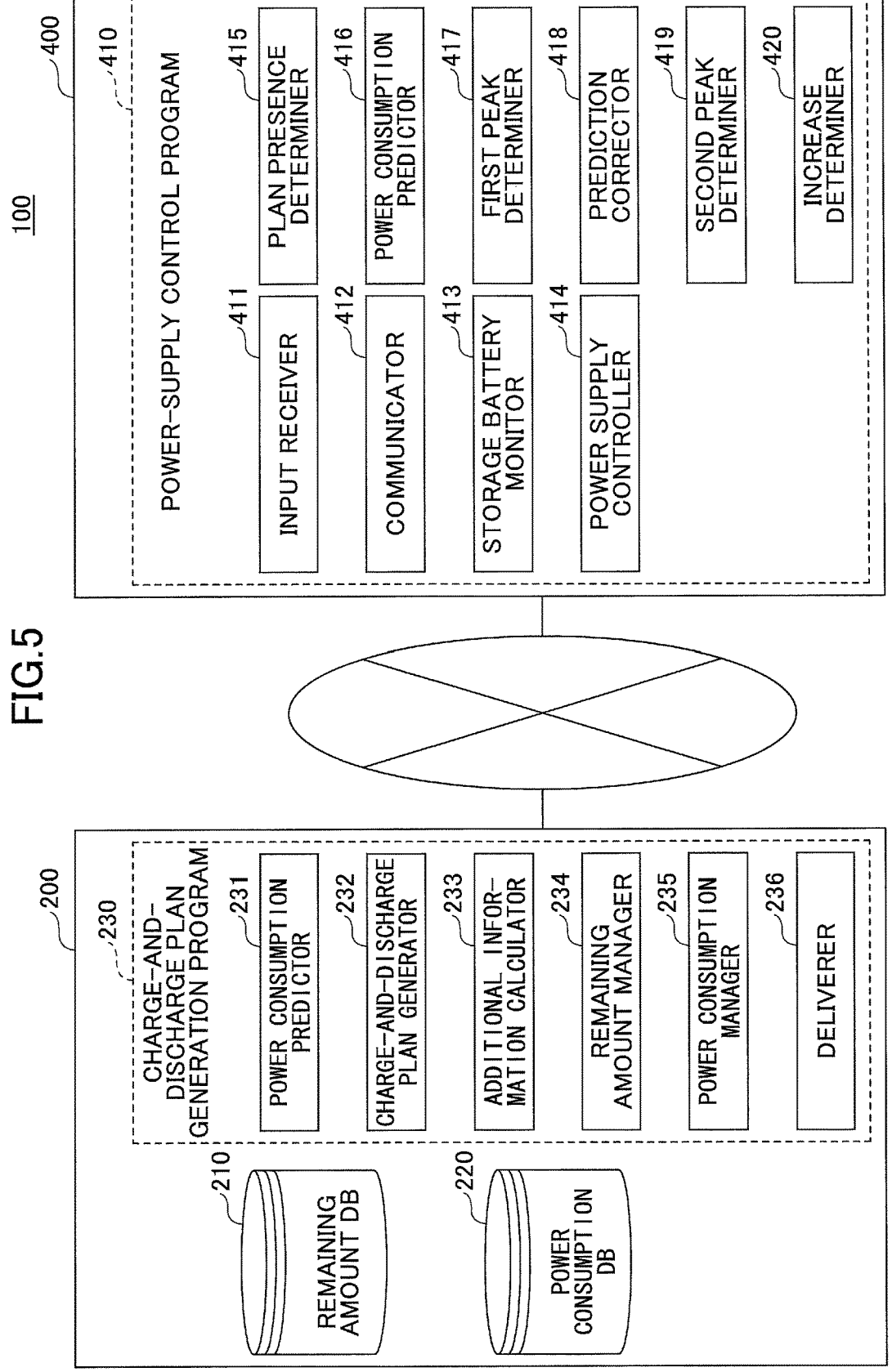
FIG. 5 is a drawing illustrating exemplary functional configurations of a delivery server and a power-supply control apparatus of a power-supply control system.

Next, functional configurations of the delivery server 200 and the power-supply control apparatus 400 of the power-supply control system 100 are described with reference to FIG. 5. FIG. 5 is a drawing illustrating exemplary functional configurations of the delivery server 200 and the power-supply control apparatus 400 of the power-supply control system 100.

The delivery server 200 may include the remaining amount database 210 and the power consumption database 220. Also, the delivery server 200 may include a power consumption predictor 231, a charge-and-discharge plan generator 232, an additional information calculator 233, a remaining amount manager 234, a power consumption manager 235, and a deliverer 236 that are implemented by executing the charge-and-discharge plan generation program 230.

The remaining amount database 210 stores the remaining amounts of charge of the storage batteries 500 of the storage battery systems 300. The power consumption database 220 stores values (past power consumption values) indicating past power consumption in the office X.

The power consumption predictor 231 calculates predictive values of power consumption (predictive power consumption values) in the office X based on the past power consumption values stored in the power consumption database 220 and climate information input to the delivery server 200 from an external source. The predictive values of power consumption may be calculated according to a known power-consumption prediction technology. The climate information of the present embodiment includes, for example, information indicating a temperature such as an outside air temperature or an ambient temperature.

The charge-and-discharge plan generator 232 generates charge-and-discharge plans for multiple time periods each having a predetermined length of time based on the latest predictive values of power consumption calculated by the power consumption predictor 231 and the latest remaining-amount data of the storage batteries 500 stored in the remaining amount database 210. More specifically, the charge-and-discharge plan generator 232 generates optimum charge-and-discharge plans by solving optimization problems for minimizing objective functions including peak power of power consumption. The charge-and-discharge plan generator 232 generates charge-and-discharge plans for the storage batteries 500 of all the storage battery systems 300 in the office X. "Time periods" of the present embodiment are described later in more detail.

The additional information calculator 233 calculates additional information to be attached to the charge-and-discharge plans for the storage batteries 500 of all the storage battery systems 300. The additional information includes a total increase in the power consumption and a total decrease in the power consumption that are expected when the power-supply control apparatuses 400 of all the storage battery systems 300 control the storage batteries 500 according to the charge-and-discharge plans in a time period.

The remaining amount manager 234 stores, in the remaining amount database 210, remaining-amount data of the storage batteries 500 sent from all the storage battery systems 300 in the office X.

The power consumption manager 235 obtains the amount of power supplied to the office X, i.e., power consumption values indicating power consumption in the office X, from, for example, an external power supply facility or a power meter provided in the office X, and stores the obtained power consumption values in the power consumption database 220.

The deliverer 236 delivers the charge-and-discharge plans for the storage batteries 500 and the additional information calculated by the additional information calculator 233 to the corresponding power-supply control apparatuses 400 of all the storage battery systems 300 in the office X. Each time charge-and-discharge plans are generated, the deliverer 236 delivers the generated charge-and-discharge plans and additional information to all the storage battery systems 300.

In the power-supply control apparatus 400 of the present embodiment, the CPU 41 executes the power-supply control program 410 to implement functions described below.

The power-supply control apparatus 400 may include an input receiver 411, a communicator 412, a storage battery monitor 413, a power supply controller 414, a plan presence determiner 415, a power consumption predictor 416, a first peak determiner 417, a prediction corrector 418, a second peak determiner 419, and an increase determiner 420.

The input receiver 411 receives various inputs to the power-supply control apparatus 400. For example, the input receiver 411 receives a charge-and-discharge plan and additional information for the storage battery 500 connected to the power-supply control apparatus 400. Also, the input receiver 411 receives power consumption values indicating power consumption in the office X from, for example, an external power supply facility or a power meter provided in the office X. These power consumption values are the same as the power consumption values that the delivery server 200 obtains. Further, the input receiver 411 receives climate information input from an external source.

The communicator 412 performs communications between the power-supply control apparatus 400 and external apparatuses.

The storage battery monitor 413 monitors the remaining amount of charge of the storage battery 500. The monitored remaining amount of charge of the storage battery 500 is sent via the communicator 412 to the delivery server 200 as remaining-amount data.

The power supply controller 414 switches power supplies for supplying power to the load 600 and controls charging and discharging of the storage battery 500 according to a charge-and-discharge plan. Specifically, the power supply controller 414 performs one of the charging operation of the storage battery 500, the discharging operation of the storage battery 500, and the bypass operation described above.

The plan presence determiner 415 determines whether a charge-and-discharge plan and additional information received from the delivery server 200 are stored in, for example, a memory such as the RAM 42.

The power consumption predictor 416 calculates predictive values of power consumption (predictive power consumption values) in the office X based on the power consumption values of the office X received by the input receiver 411 and the climate information input to the power-supply control apparatus 400 from an external source. The power consumption predictor 416 may be configured to calculate the predictive values of power consumption in a manner similar to that employed by the power consumption predictor 231 of the delivery server 200.

The first peak determiner 417 determines whether a peak of power consumption exists in the nearest time period based on the predictive values of power consumption calculated by the power consumption predictor 416.

When the first peak determiner 417 determines that the peak of power consumption does not exist in the nearest time period, the prediction corrector 418 corrects the predictive values of power consumption using the additional information stored in the RAM 42.

The second peak determiner 419 determines whether a peak of power consumption exists in the nearest time period based on the corrected predictive values of power consumption (corrected predictive power consumption values) corrected by the prediction corrector 418.

The increase determiner 420 determines whether a total increase included in additional information is greater than 0.

Details of the first peak determiner 417, the prediction corrector 418, the second peak determiner 419, and the increase determiner 420 are described later.

Next, "time periods" of the present embodiment are described with reference to FIG. 6. FIG. 6 is a drawing illustrating time periods.

In the present embodiment, a time period indicates duration T between a time point and another time point. For example, a time period between a time k and a time k+1 is referred to as a time period k', a time period between the time k+1 and a time k+2 is referred to as a time period k'+1, and a time period between the time k+2 and a time k+3 is referred to as a time period k'+2. Accordingly, in the present embodiment, when charge-and-discharge plans are generated for H time periods from the time k, the H time periods correspond to time periods k' through k'+H−1.

In the present embodiment, it is assumed that generation of charge-and-discharge plans and calculation of additional information are performed at the start time of each time period. That is, charge-and-discharge plans and additional information for the time period k' are generated and calculated at the time k that is the start time of the time period k', and are delivered to the power-supply control apparatuses 400 of the storage battery systems 300. Similarly, charge-and-discharge plans and additional information for the time period k'+1 are generated and calculated at the time k+1 that is the start time of the time period k'+1 (or the end time of the time period k'), and are delivered to the power-supply control apparatuses 400 of the storage battery systems 300.

Next, charge-and-discharge plans and additional information of the present embodiment are described with reference to FIGS. 7 through 9B. FIG. 7 is a table illustrating exemplary charge-and-discharge plans and additional information.

FIG. 7 illustrates exemplary charge-and-discharge plans and additional information for three time periods generated by the charge-and-discharge plan generator 232 of the delivery server 200 for the storage battery system 300-1.

In this example, the delivery server 200 delivers, at the time k, charge-and-discharge plans and additional information of the storage battery system 300-1 for the time period k', the time period k'+1, and the time period k'+2 to the power-supply control apparatus 400 of the storage battery system 300-1.

In FIG. 7, the charge-and-discharge plan of the storage battery system 300-1 generated at the time k for the time period k' is represented by $S_1[k'|k]$. Also, the total increase and the total decrease in the additional information calculated at the time k for the time period k' are represented by $\sigma c[k'|k]$ and $\sigma d[k'|k]$, respectively.

The total increase $\sigma c[k'|k]$ indicates an increase in power consumption in the time period k' that is expected when all the storage battery systems 300 connected to the delivery server 200 operate according to charge-and-discharge plans in the time period k'. The total decrease $\sigma d[k'|k]$ indicates a decrease in power consumption in the time period k' that is expected when all the storage battery systems 300 connected to the delivery server 200 operate according to charge-and-discharge plans in the time period k'.

Similarly, in FIG. 7, the charge-and-discharge plan, the total increase, and the total decrease generated and calculated at the time k for the time period k'+1 are represented by $S_1[k'+1|k]$, $\sigma c[k'+1|k]$, and $\sigma d[k'+1|k]$, respectively. Also in FIG. 7, the charge-and-discharge plan, the total increase, and the total decrease generated and calculated at the time k for the time period k'+2 are represented by $S_1[k'+2|k]$, $\sigma c[k'+2|k]$, and $\sigma d[k'+2|k]$, respectively.

The power-supply control apparatus 400 of the storage battery system 300-1 obtains the charge-and-discharge plans and the additional information for the three time periods at the time k that is the start time of the time period k', and stores the charge-and-discharge plans and the additional information in, for example, the RAM 42.

Next, at the time k+1 that is the start time of the time period k'+1 next to the time period k', the delivery server 200 delivers charge-and-discharge plans and additional information of the storage battery system 300-1 for the time period k'+1, the time period k'+2, and the time period k'+3 to the power-supply control apparatus 400 of the storage battery system 300-1.

The charge-and-discharge plan for the time period k'+1 generated at the time k+1 is not the same as the charge-and-discharge plan $S_1[k'+1|k]$ for the time period k'+1 generated at the time k. Also, the additional information for the time period k'+1 calculated at the time k+1 is not the same as the additional information for the time period k'+1 calculated at the time k.

Accordingly, in FIG. 7, the charge-and-discharge plan, the total increase, and the total decrease generated and calculated at the time k+1 for the time period k'+1 are represented by $S_1[k'+1|k+1]$, $\sigma c[k'+1|k+1]$, and $\sigma d[k'+1|k+1]$, respectively. Also in FIG. 7, the charge-and-discharge plan, the total increase, and the total decrease generated and calculated at the time k+1 for the time period k'+2 are represented by $S_1[k'+2|k+1]$, $\sigma c[k'+2|k+1]$, and $\sigma d[k'+2|k+1]$, respectively. Further in FIG. 7, the charge-and-discharge plan, the total increase, and the total decrease generated and calculated at the time k+1 for the time period k'+3 are represented by $S_1[k'+3|k+1]$, $\sigma c[k'+3|k+1]$, and $\sigma d[k'+3|k+1]$, respectively.

The power-supply control apparatus 400 of the storage battery system 300-1 obtains the charge-and-discharge plans and the additional information for the three time periods at the time k+1 that is the start time of the time period k'+1, and stores the charge-and-discharge plans and the additional information in, for example, the RAM 42.

Although the storage battery system 300-1 is used as an example in the above descriptions of FIG. 7, charge-anddischarge plans and additional information are also delivered to other storage battery systems 300 at the start time of each time period in a similar manner. For each time period, the same additional information is delivered to all the storage battery systems 300.

For example, at the time k, the following charge-and-discharge plans and additional information are delivered to the storage battery system 300-2: a charge-and-discharge plan $S_2[k'|k]$ of the storage battery system 300-2, the total increase σc[k'|k], and the total decrease σd[k'|k] for the time period k'; a charge-and-discharge plan $S_2[k'+1|k]$ of the storage battery system 300-2, the total increase σc[k'+1|k], and the total decrease σd[k'+1|k] for the time period k'+1; and a charge-and-discharge plan $S_2[k'+2|k]$ of the storage battery system 300-2, the total increase σc[k'+2|k], and the total decrease σd[k'+2|k] for the time period k'+2.

Figures 8, 9A:
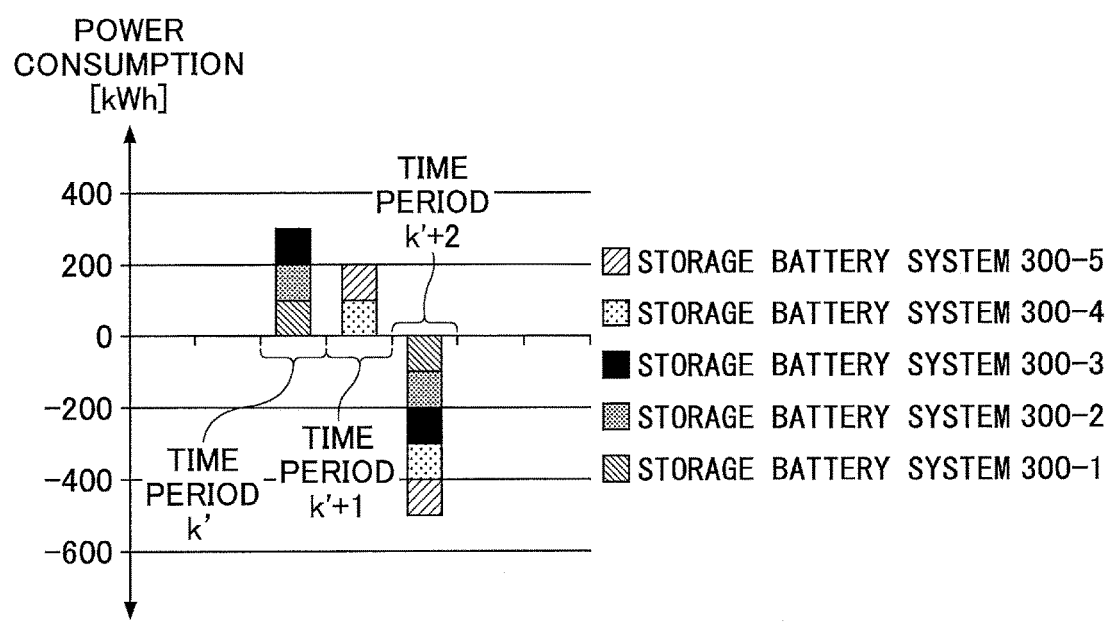
FIG. 8 is a table illustrating an exemplary charge-and-discharge plan.
FIGS. 9A and 9B are graphs used to describe a total increase and a total decrease in power consumption.

Next, a charge-and-discharge plan is described with reference to FIG. 8. FIG. 8 is a table illustrating an exemplary charge-and-discharge plan. FIG. 8 illustrates a charge-and-discharge plan $S_1[k'|k]$ of the storage battery system 300-1 generated at the time k for the time period k'.

The charge-and-discharge plan $S_1[k'|k]$ indicates operations to be performed by the storage battery system 300-1 in the time period k'. In the example of FIG. 8, the charge-and-discharge plan $S_1[k'|k]$ indicates that the charging operation of the storage battery 500 is performed from the time k to time k+a, and the bypass operation is performed from the time k+a to the time k+1 that is the start time of the time period k'+1 (or the end time of the time period k').

The power-supply control apparatus 400 performs charging and discharging of the storage battery 500 according to the charge-and-discharge plan $S_1[k'|k]$.

Figure 9B:
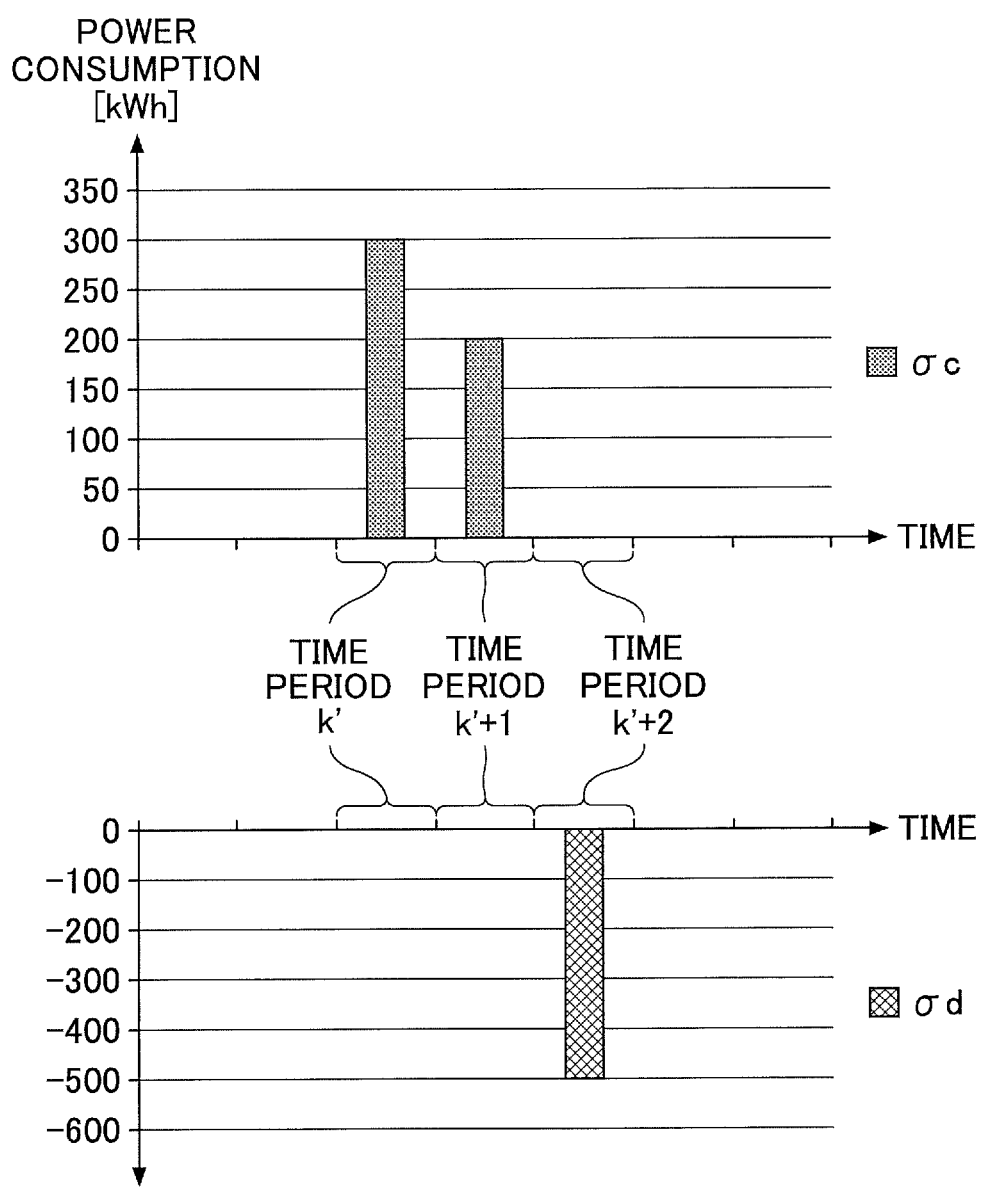

Next, a total increase and a total decrease included in additional information of the present embodiment are described with reference to FIGS. 9A and 9B. FIGS. 9A and 9B are graphs used to describe a total increase and a total decrease in power consumption. FIG. 9A illustrates increases and decreases in power consumption in time periods k' through k'+2 that result when charge-and-discharge plans for the respective time periods are executed by all the storage battery systems 300 connected to the delivery server 200. In FIGS. 9A and 9B, the value "0" on the vertical axes corresponds to a case where the bypass operation is performed in all the storage battery systems 300. FIG. 9B illustrates total increases and total decreases in power consumption in the respective time periods.

In FIGS. 9A and 9B, it is assumed that storage battery systems 300-1 through 300-5 are connected to the delivery server 200.

As illustrated by FIG. 9A, in the time period k', the amount of power supplied to each of the storage battery systems 300-1, 300-2, and 300-3 increases, and the amount of power supplied to none of the storage battery systems 300 decreases. Thus, when the storage battery systems 300 perform the charge-and-discharge plans for the time period k', the power consumption in the time period k' becomes higher than power consumption in a case where all the storage battery systems 300 perform the bypass operation.

Similarly, in the time period k'+1, the amount of power supplied to each of the storage battery systems 300-4 and 300-5 increases, and the amount of power supplied to none of the storage battery systems 300 decreases. Thus, when the storage battery systems 300 perform the charge-and-discharge plans for the time period k'+1, the power consumption in the time period k'+1 becomes higher than power consumption in a case where all the storage battery systems 300 perform the bypass operation.

On the other hand, in the time period k'+2, when the storage battery systems 300 perform the charge-and-discharge plans for the time period k'+2, the power consumption becomes lower than power consumption in a case where all the storage battery systems 300 perform the bypass operation.

When charge-and-discharge plans for multiple time periods are to be delivered, the additional information calculator 233 of the delivery server 200 calculates, for the respective time periods, amounts increased and decreased from the power consumption at the start time of the first time period of the multiple time periods, and uses the calculated amounts as total increases and total decreases.

Total increases and total decreases in FIG. 9B indicate the amounts increased and decreased in the respective time periods from the power consumption at the start time k of the time period k'.

In the example of FIG. 9B, in the time period k', the total increase σc[k'|k] is 300 kWh and the total decrease σd[k'|k] is 0 kWh. In the time period k'+1, the total increase σc[k'+1|k] is 200 kWh and the total decrease σd[k'+1|k] is 0 kWh. In the time period k'+2, the total increase σc[k'+2|k] is 0 kWh and the total decrease σd[k'+2|k] is −500 kWh.

As described above, in the present embodiment, both an increase and a decrease in power consumption are calculated for each time period. Accordingly, the present embodiment makes it possible to detect a variation in the amount of power supplied to each storage battery system 300 even in a case where an increase and a decrease in power consumption are the same (i.e., offset each other) and as a result, the power consumption does not change.

Next, before descriptions of processes performed by apparatuses constituting the power-supply control system 100 of the present embodiment, symbols used in the descriptions of the processes are described.

In the present embodiment, p[l'|k] indicates a predictive power consumption value calculated at a time k for a time period l', and $S_i$[l'|m] indicates a charge-and-discharge plan of a storage battery system 300-i generated at a time m for the time period l'. Also, σc[l'|m] indicates a total increase and σd[l'|m] indicates a total decrease that result when all the storage battery systems 300 operate according to charge-and-discharge plans $S_i$[l'|m].

A corrected predictive power consumption value p⁻[l'|k, m] calculated by the prediction corrector 418 of the power-supply control apparatus 400 is represented by formula 1 below.

The corrected predictive power consumption value p⁻[l'|k,m] is a predictive value of power consumption in each time period that is predicted when all the storage battery systems 300 execute the charge-and-discharge plans $S_i$[l'|m] stored in the RAM 42.

$$p^\sim[l' \mid k, m] = \begin{cases} p[l' \mid k] + \sigma c[l' \mid m] + & l' = k', k'+1, \ldots, \\ \quad \sigma d[l' \mid m], & m' + H - 1 \\ p[l' \mid k], & l' = m' + H, m' + H + 1, \ldots, k' + H - 1 \end{cases} \quad 1$$

In formula 1, k indicates the present time, and m indicates a past time before the time k. Also in formula 1, m' indicates a time period from the time m. Thus, the corrected predictive power consumption value p⁻[l'|k,m] of the present embodiment is obtained by correcting a predictive power consumption value of the time period l' calculated at the time k, by using a total increase and a total decrease in the time period l' calculated at the time m before the time k.

Further in formula 1, H indicates the number of time periods for which charge-and-discharge plans $S_i[l'|m]$ are generated at the delivery server 200, and is set in the delivery server 200 in advance.

Figure 10:
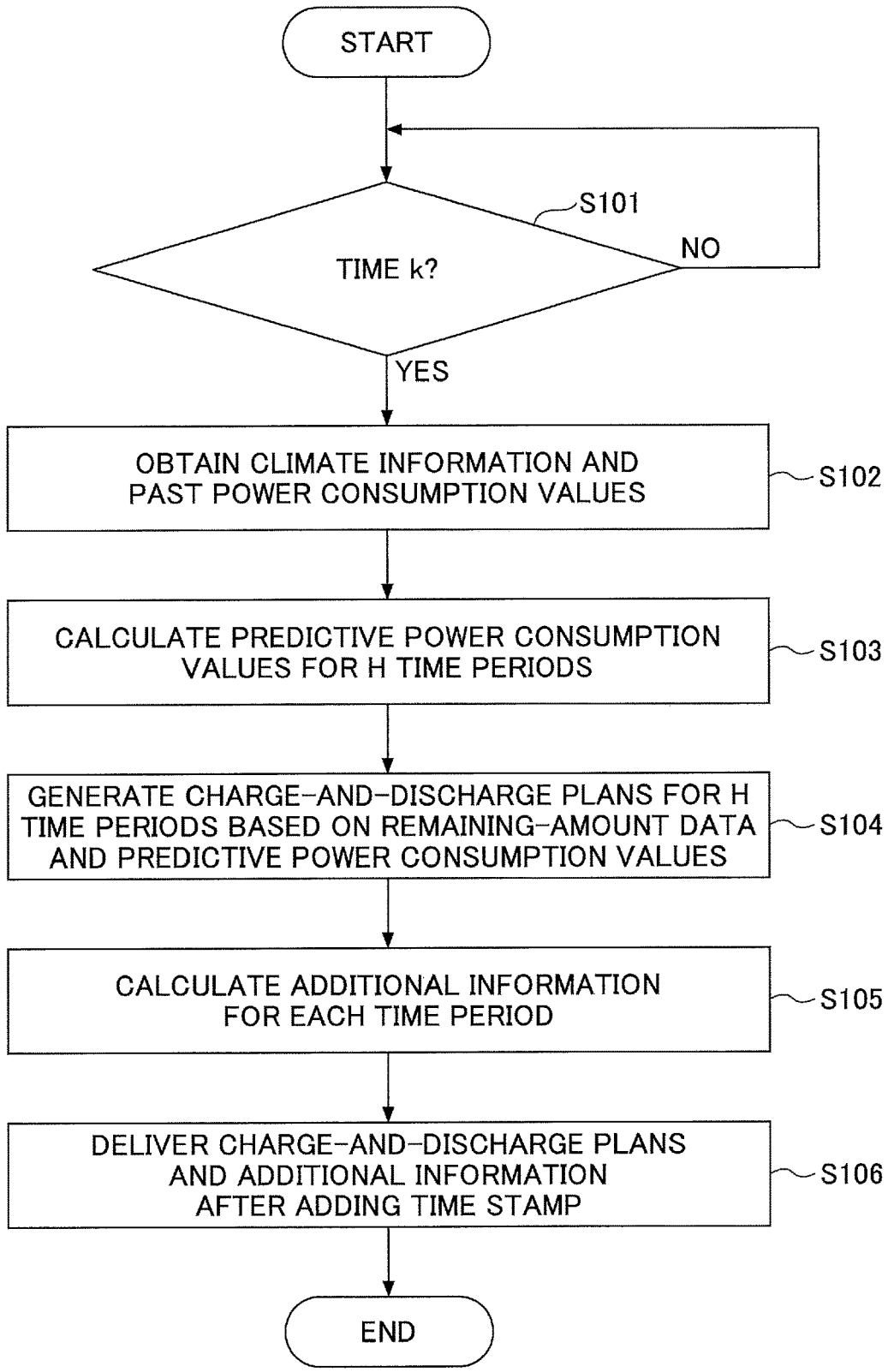
FIG. 10 is a flowchart illustrating an exemplary process performed by a delivery server.

Next, an exemplary process performed by the delivery server 200 of the present embodiment is described with reference to FIG. 10. FIG. 10 is a flowchart illustrating an exemplary process performed by the delivery server 200.

The delivery server 200 determines whether it is the time k that is the start time of the time period k' (step S101). When it is not the time k at step S101, the delivery server 200 waits until it becomes the time k. When it is the time k at step S101, the delivery server 200 obtains past power consumption values of past time periods from the power consumption database 220, and also obtains climate information (step S102). The climate information includes, for example, a temperature.

Next, the power consumption predictor 231 of the delivery server 200 calculates predictive power consumption values for H time periods from the time period k' using the past power consumption values and the climate information (step S103). Next, the charge-and-discharge plan generator 232 of the delivery server 200 generates charge-and-discharge plans of the storage battery systems 300 for the H time periods based on remaining-amount data of the storage batteries 500 stored in the remaining amount database 210 and the predictive power consumption values calculated at step S103 (step S104).

Next, the additional information calculator 233 of the delivery server 200 calculates additional information including a total increase and a total decrease for each time period (step S105).

Then, the delivery server 200 adds a time stamp to the charge-and-discharge plans and the additional information for the H time periods, delivers the charge-and-discharge plans and the additional information to the storage battery systems 300, and ends the process.

The delivery server 200 performs the above process at the start time of every time period.

Figure 11:
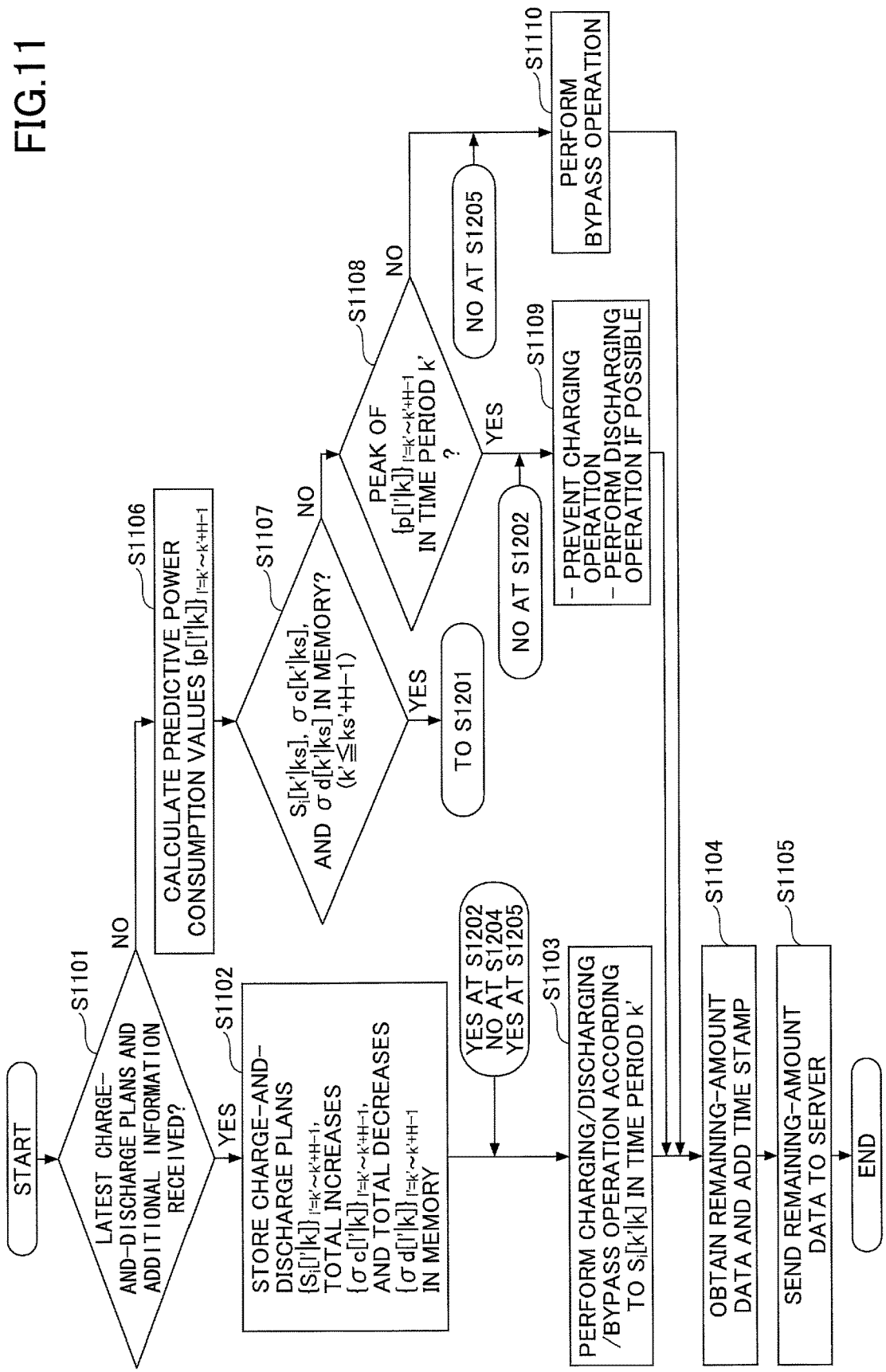
FIG. 11 is a flowchart illustrating an exemplary process performed by a power-supply control apparatus.

Next, an exemplary process performed by the power-supply control apparatus 400 of the present embodiment is described with reference to FIGS. 11 and 12. FIG. 11 is a flowchart illustrating an exemplary process performed by the power-supply control apparatus 400.

The input receiver 411 of the power-supply control apparatus 400 determines whether latest charge-and-discharge plans and additional information for H time periods have been received (step S1101).

When it is determined at step S1101 that the latest charge-and-discharge plans and additional information have been received, the power-supply control apparatus 400 stores the received charge-and-discharge plans and additional information in a memory such as the RAM 42 (step S1102). In this exemplary process, it is assumed that charge-and-discharge plans $\{S_i[l'|k]\}_{l'=k'\sim k'+H-1}$ generated at the time k for the time periods k' through k'+H−1 have been received at step S1101. Also in this exemplary process, it is assumed that the additional information received at step S1101 includes total increases $\{\sigma c[l'|k]\}_{l'=k'\sim k'+H-1}$ and total decreases $\{\sigma d[l'|k]\}_{l'=k'\sim k'+H-1}$ calculated at the time k for the time periods l' through l'+H−1. Here, the time k indicates the current time (the present time).

Next, in the time period k', the power supply controller 414 of the power-supply control apparatus 400 performs one of the charging operation of the storage battery 500, the discharging operation of the storage battery 500, and the bypass operation according to the received charge-and-discharge plan $S_i[k'|k]$ (step S1103). Next, the storage battery monitor 413 of the power-supply control apparatus 400 obtains remaining-amount data of the storage battery 500, and adds a time stamp to the remaining-amount data (step S1104). Then, the communicator 412 of the power-supply control apparatus 400 sends the remaining-amount data with the time stamp to the delivery server 200 (step S1105), and the power-supply control apparatus 400 ends the process.

When it is determined at step S1101 that the latest charge-and-discharge plans and additional information have not been received, the power consumption predictor 416 of the power-supply control apparatus 400 calculates predictive power consumption values (step S1106). In this exemplary process, it is assumed that the power consumption predictor 416 calculates predictive power consumption values $\{p[l'|k]\}_{l'=k'\sim k'+H-1}$ for the time periods k' through k'+H−1 at the time k. The predictive power consumption values may be calculated at step S1106 according to a known algorithm.

Next, the plan presence determiner 415 of the power-supply control apparatus 400 determines whether a previously-received charge-and-discharge plan and additional information are stored in a memory (step S1107).

More specifically, assuming that ks indicates the time when previously-received charge-and-discharge plans were generated, the plan presence determiner 415 determines whether a charge-and-discharge plan $S_i[k'|ks]$ generated at the time ks for the time period k' exists in the memory. Also, the plan presence determiner 415 determines whether a total increase $\sigma c[k'|ks]$ and a total decrease $\sigma d[k'|ks]$ generated at the time ks for the time period k' exist in the memory.

In other words, at step S1107, when ks' indicates a time period that starts at the time ks before the time k, the plan presence determiner 415 determines whether k'≤ks'+H−1 is satisfied. That is, the plan presence determiner 415 determines whether the time period k' is included in H time periods from the time period ks'.

When it is determined at step S1107 that the previously-received charge-and-discharge plan and additional information are stored in the memory, the power-supply control apparatus 400 proceeds to step S1201 of FIG. 12.

When it is determined at step S1107 that the previously-received charge-and-discharge plan and additional information are not stored in the memory, the first peak determiner 417 of the power-supply control apparatus 400 determines whether a peak of the predictive power consumption values calculated at step S1106 is in the nearest time period k' (step S1108). In other words, based on past power consumption values and the predictive power consumption values $\{p[l'|k]\}_{l'=k'\sim k'+H-1}$ calculated at the time k for the time periods k' through k'+H−1, the first peak determiner 417 determines whether the predictive power consumption value of the nearest time period k' is largest. The power-supply control apparatus 400 of the present embodiment preferably stores actual power consumption values detected in the past in a memory.

When it is determined at step S1108 that the peak is in the time period k', the power supply controller 414 of the power-supply control apparatus 400 prevents the charging operation of the storage battery 500, performs the discharging operation of the storage battery 500 if the storage battery 500 can discharge electricity (step S1109), and proceeds to step S1104.

When it is determined at step S1108 that the peak is not in the time period k', the power supply controller 414 of the power-supply control apparatus 400 performs the bypass operation (step S1110), and proceeds to step S1104.

As described above, when no previously-delivered charge-and-discharge plan is stored in the memory, the power-supply control apparatus 400 calculates latest predictive power consumption values and determines whether a peak of power consumption exists in the nearest time period. When the peak of power consumption exists in the nearest time period, the power-supply control apparatus 400 prevents the storage battery 500 from being charged and causes the storage battery 500 to discharge electricity if possible. Thus, in the present embodiment, the amount of power to be used to charge the storage battery 500 is saved by preventing charging the storage battery 500, and the storage battery 500 is caused to discharge electricity if possible. Accordingly, the present embodiment makes it possible to reduce power consumption in a time period where a peak of predictive power consumption values exists.

FIG. 12 is another flowchart illustrating an exemplary process performed by the power-supply control apparatus 400. When it is determined at step S1107 of FIG. 11 that the previously-received charge-and-discharge plan and additional information are stored in the memory, the power-supply control apparatus 400 proceeds to step S1201 of FIG. 12.

Because step S1201 of FIG. 12 is substantially the same as step S1108 of FIG. 11, its description is omitted here.

When it is determined at step S1201 that the peak of the predictive power consumption values is in the time period k', the increase determiner 420 of the power-supply control apparatus 400 determines whether the total increase σc[k'|ks] of the time period k' stored in the memory is 0 (step S1202). In other words, the increase determiner 420 determines whether the charging operation is planned in the time period k'.

When it is determined at step S1202 that the total increase σc[k'|ks] is 0, the power-supply control apparatus 400 proceeds to step S1103 of FIG. 11. When the total increase σc[k'|ks] is 0, the charge-and-discharge plan $S_i$[k'|ks] generated at the time ks for the time period k' will not increase peak power or cause a new peak in the time period k', and is therefore considered appropriate. Therefore, the power-supply control apparatus 400 proceeds to step S1103 of FIG. 11, and executes the charge-and-discharge plan $S_i$[k'|ks] generated at the time ks for the time period k'.

When it is determined at step S1202 that the total increase σc[k'|ks] is not 0, the power-supply control apparatus 400 proceeds to step S1109 of FIG. 11. When the total increase σc[k'|ks] is not 0, the charge-and-discharge plan $S_i$[k'|ks] generated at the time ks for the time period k' will increase power consumption in the nearest time period k'. Therefore, the power-supply control apparatus 400 proceeds to step S1109 of FIG. 11, and prevents the charging operation of the storage battery 500.

When it is determined at step S1201 that the peak of the predictive power consumption values is not in the time period k', the prediction corrector 418 of the power-supply control apparatus 400 calculates corrected predictive power consumption values $\{p^-[l'|k,ks]\}_{l'=k'-k'+H-1}$ based on the predictive power consumption values of the respective time periods calculated at step S1106, and total increases and total decreases stored in the memory (step S1203).

As described above, at step S1106, the predictive power consumption values $\{p[l'|k]\}_{l'=k'-k'+H-1}$ are calculated at the time k for the time periods k' through k'+H−1. Also, it is assumed that total increases $\{\sigma c[l'|ks]\}_{l'=ks'-ks'+H-1}$ calculated at the time ks for the time periods ks' through ks'+H−1 are stored in the memory. Further, it is assumed that total decreases $\{\sigma d[l'|ks]\}_{l'=ks'-ks'+H-1}$ calculated at the time ks for the time periods ks' through ks'+H−1 are stored in the memory. A time period l' is included in the time periods ks' through ks'+H−1.

Thus, at step S1203, the corrected predictive power consumption values $\{p^-[l'|k,ks]\}_{l'=k'-k'+H-1}$ are obtained by correcting the predictive power consumption values of the respective time periods calculated at the time k, by using the total increases and the total decreases of the respective time periods calculated at the time ks before the time k.

Next, based on the corrected predictive power consumption values $\{p^-[l'|k,ks]\}_{l'=k'-k'+H-1}$ for the time periods k' through k'+H−1, the second peak determiner 419 of the power-supply control apparatus 400 determines whether a peak of the corrected predictive power consumption values is in the nearest time period k' (step S1204).

When it is determined at step S1204 that the peak of the corrected predictive power consumption values is not in the time period k', the power-supply control apparatus 400 proceeds to step S1103 of FIG. 11.

When it is determined at step S1204 that the peak of the corrected predictive power consumption values is in the time period k', the increase determiner 420 of the power-supply control apparatus 400 determines whether the total increase σc[k'|ks] of the time period k' stored in the memory is 0 (step S1205).

When it is determined at step S1205 that the total increase σc[k'|ks] is 0, the power-supply control apparatus 400 proceeds to step S1103 of FIG. 11.

When it is determined at step S1205 that the total increase σc[k'|ks] is not 0, the power-supply control apparatus 400 proceeds to step S1110 of FIG. 11.

Here, NO at step S1205 indicates that it is expected that power consumption peaks and further increases in the nearest time period k' when the power consumption in the time period k' is predicted taking into account an increase and a decrease in power consumption caused by executing the charge-and-discharge plan in the memory. In other words, NO at step S1205 indicates a case where the current power usage status is different from the power usage status at the time ks when the charge-and-discharge plan was generated, and a problem such as an increase in peak power or an occurrence of a new peak may be caused when the charge-and-discharge plan stored in the memory is executed.

Thus, the power-supply control apparatus 400 of the storage battery system 300 of the present embodiment is configured to detect conditions that may cause a problem as described above and perform the bypass operation without executing a charge-and-discharge plan when such conditions are detected. This configuration makes it possible to reliably control a power supply even when the latest charge-and-discharge plan is not delivered.

Figure 13A:
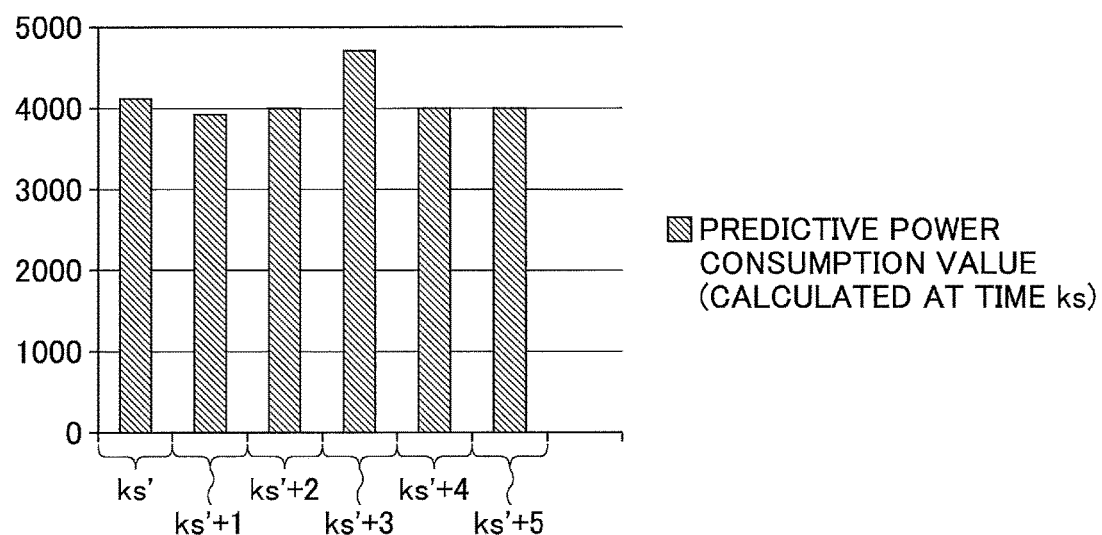
FIGS. 13A through 13C are graphs used to describe effects of a power-supply control system.
Figure 13B:
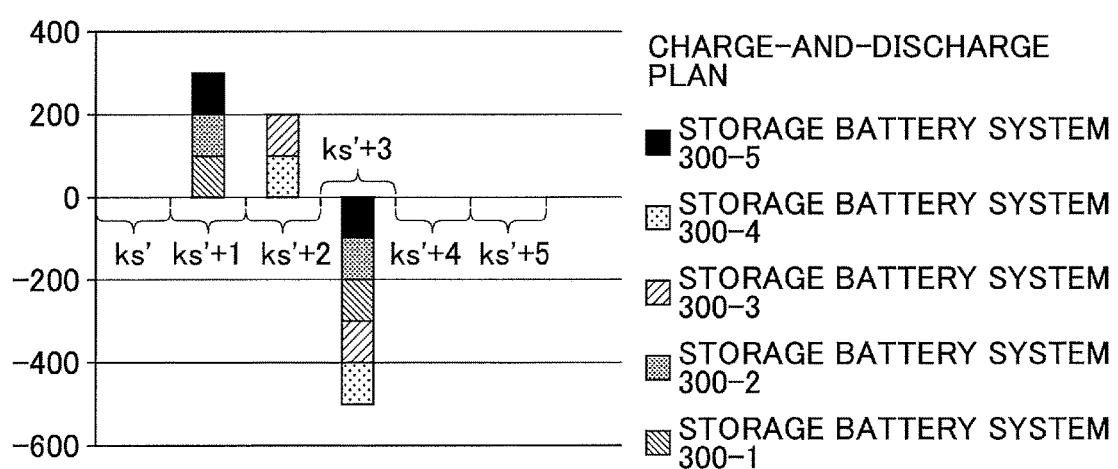
Figure 13C:
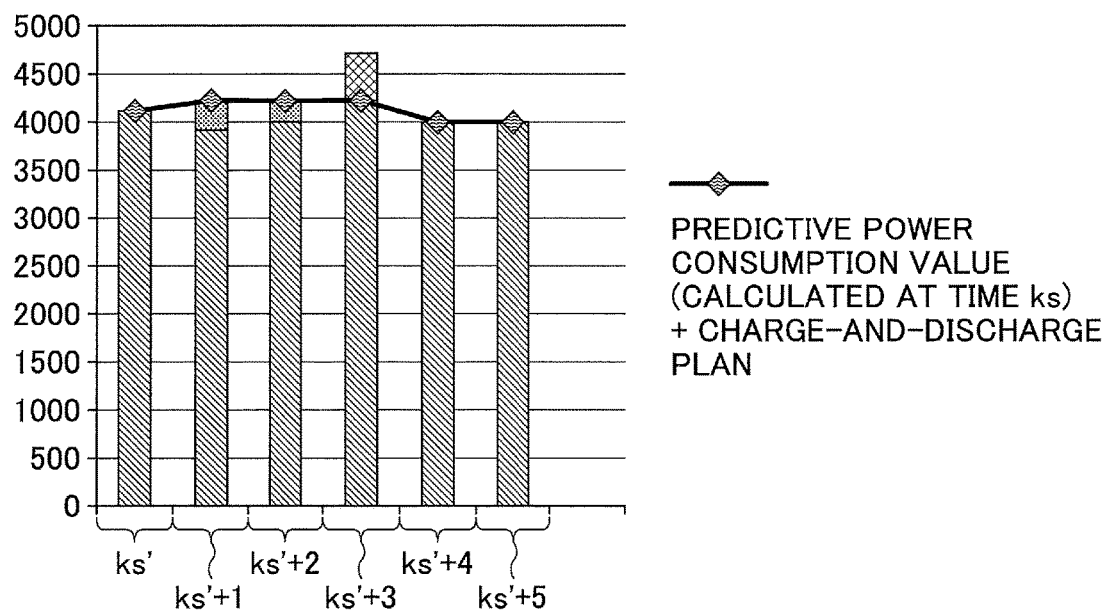

Effects of the present embodiment are described below with reference to FIGS. 13A through 14C. FIGS. 13A through 13C are graphs used to describe effects of the power-supply control system 100.

FIG. 13A illustrates predictive power consumption values calculated at the time ks for the time periods ks' through ks'+5. FIG. 13B illustrates charge-and-discharge plans generated at the time ks for the time periods ks' through ks'+5. FIG. 13C illustrates predictive power consumption values for the time periods ks' through ks'+5 that are predicted when the charge-and-discharge plans generated at the time ks are executed.

As indicated by FIG. 13A, in the predictive power consumption values for the time periods ks' through ks'+5, the predictive power consumption value for the time period ks'+1 is smallest, and the predictive power consumption value for the time period ks'+3 is largest.

According to the charge-and-discharge plans of FIG. 13B, the total increase σc[ks'|ks] in the time period ks' is 0 kWh, the total increase σc[ks'+1|ks] in the time period ks'+1 is 300 kWh, and the total increase σc[ks'+2|ks] in the time period ks'+2 is 200 kWh. Also, the total decrease σd[ks'+3|ks] in the time period ks'+3 is −500 kWh.

As indicated by FIG. 13C, assuming that the charge-and-discharge plans are executed, the predictive power consumption value of the time period ks'+1 increases by 300 kWh, the predictive power consumption value of the time period ks'+2 increases by 200 kWh, and the predictive power consumption value of the time period ks'+3 decreases by 500 kWh. As a result, the power consumption in the time periods ks' through ks'5 is leveled.

Next, an exemplary case where the latest charge-and-discharge plans and additional information at the current time are not delivered is described with reference to FIGS. 14A through 14C. In this case, the power-supply control apparatus 400 controls charging and discharging of the storage battery 500 using the charge-and-discharge plans and additional information for the time periods ks' through ks'+5 stored in the memory.

Here, it is assumed that the time k is the same as the time ks+1 that is the start time of the time period ks'+1. That is, the time period k' of FIGS. 14A through 14C corresponds to the time period ks'+1 of FIGS. 13A through 13C.

Figure 14A:
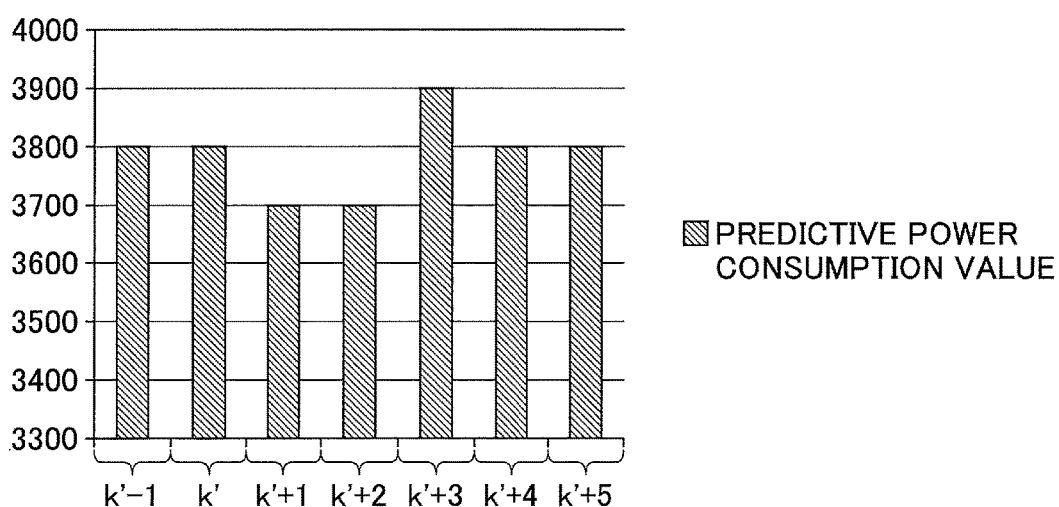
FIGS. 14A through 14C are graphs used to describe effects of a power-supply control system.
Figure 14B:
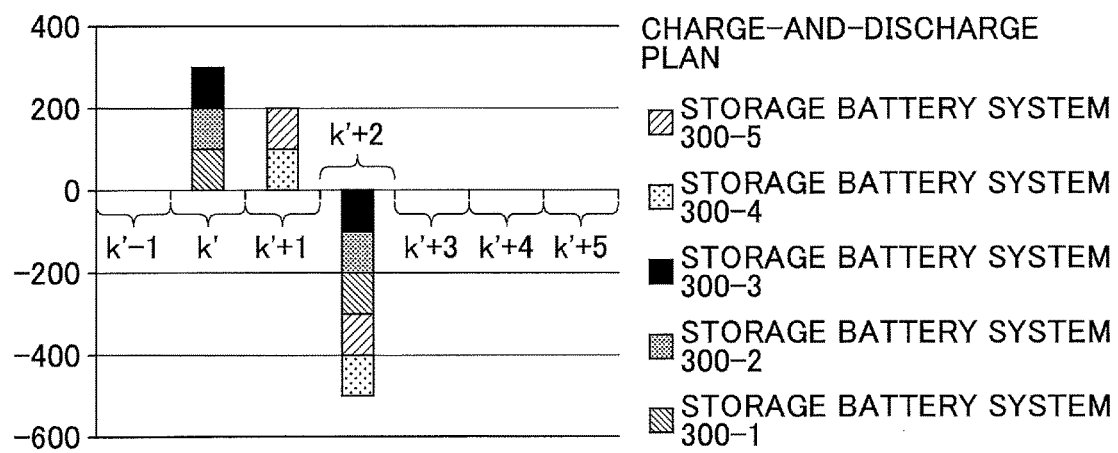
Figure 14C:
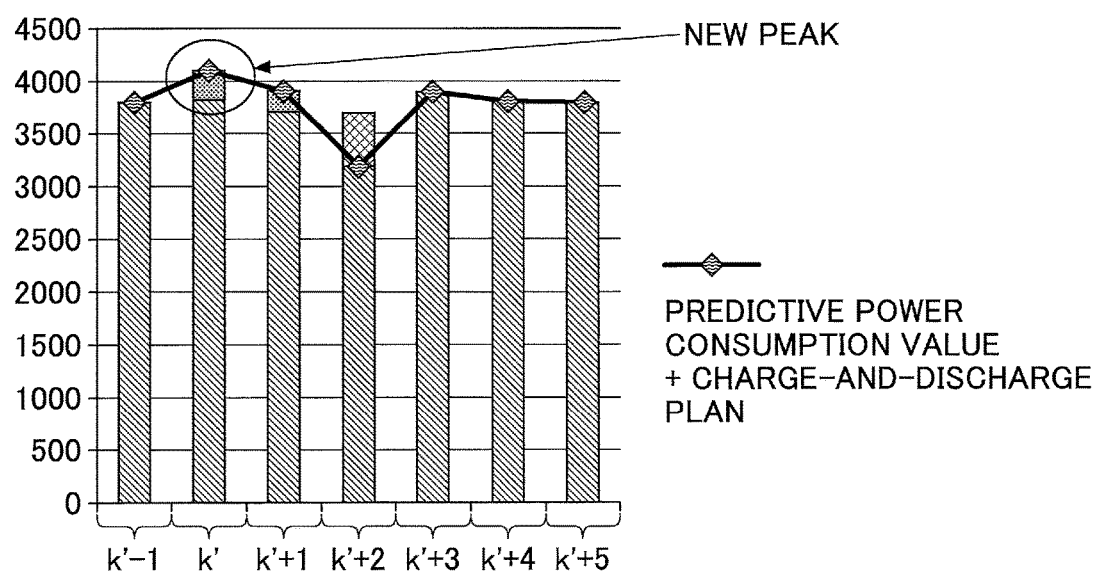

FIGS. 14A through 14C are graphs used to describe effects of the power-supply control system 100. FIG. 14A illustrates an actual power consumption value of the time period k'−1, and predictive power consumption values calculated at the time k for the time periods k' through k'+5. FIG. 14B illustrates charge-and-discharge plans and additional information stored in a memory of the power-supply control apparatus 400. FIG. 14C illustrates the actual power consumption value of the time period k'−1, and predictive power consumption values that are predicted when the charge-and-discharge plans stored in the memory are executed without change.

As indicated by FIG. 14A, in the predictive power consumption values calculated at the time k, the predictive power consumption value for the time period k' (the time period ks'+1 of FIGS. 13A-13C) is larger than the predictive power consumption value for the time period k'+1 (the time period ks'+2 of FIGS. 13A-13C). This indicates that the power usage status at the time k is different from the power usage status at the time ks.

In this case, when the charge-and-discharge plans stored in the memory are executed, the predictive power consumption value of the time period k' increases to 4100 kWh and becomes a new peak.

Here, the total increase σc[k'|ks] (i.e., the total increase σc[ks'+1|ks]) of the time period k' is 300 kWh and the total decrease σd[k'|k] is 0 kWh, and is not 0 kWh.

For this reason, the power-supply control apparatus 400 of the present embodiment prevents the storage battery 500 from being charged in the time period k' and performs the bypass operation in order to reduce the total increase and thereby reduce the power consumption in the time period k'. Thus, the present embodiment makes it possible to prevent an occurrence of a new peak.

Figure 15:
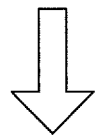
FIG. 15 is a drawing illustrating a change made to a charge-and-discharge plan.

Next, an exemplary process performed by the power-supply control apparatus 400 to change a charge-and-discharge plan is described with reference to FIG. 15. FIG. 15 is a drawing illustrating a change made to a charge-and-discharge plan.

FIG. 15 illustrates a charge-and-discharge plan for the time period k' generated at the time ks and a charge-and-discharge plan for the time period k' changed (or corrected) at the time k.

When charge-and-discharge plans are not delivered at the current time k, and it is determined that the predictive power consumption value of the nearest time period k' becomes a peak if a charge-and-discharge plan of the time period k' stored in the memory is executed, the power-supply control apparatus 400 may be configured to change the charge-and-discharge plan.

In the example of FIG. 15, the power-supply control apparatus 400 changes the charging operation in the charge-and-discharge plan generated at the time ks to the bypass operation.

As described above, based on a previously-generated charge-and-discharge plan and additional information stored in the memory, the power-supply control apparatus 400 of the present embodiment can change the previously-generated charge-and-discharge plan into a charge-and-discharge plan suitable for the current time, and can improve reliability in power-supply control.

According to the present embodiment, the delivery server 200 needs to send only charge-and-discharge plans and additional information to the storage battery systems 300 to improve reliability in power-supply control. This in turn eliminates the need for the delivery server 200 to send separate information to each of the storage battery systems 300, and makes it possible to reduce communication loads.

Also in the present embodiment, the delivery server 200 delivers additional information including a total increase and a total decrease instead of delivering charge-and-discharge plans of all the storage battery systems 300 to each of the storage battery systems 300. Thus, the present embodiment makes it possible to reduce the amount of data to be delivered by the delivery server 200, and to reduce processing loads of the power-supply control apparatuses 400 of the storage battery systems 300.

A storage battery is used in the present embodiment as an object whose charging and discharging operations are controlled. However, this disclosure may also be applied to other electric storage devices such as a capacitor and a flywheel energy storage. Further, this disclosure may also be applied to a heat storage tank for storing heat. In this case, heat transfer corresponds to power consumption in the present embodiment.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power-supply control apparatus, comprising:
a processor that executes a process including:
calculating, for a first time period, a first predictive value of total power consumption by the power-supply control apparatus and one or more other power-supply control apparatuses to which power is supplied from a power supply;

determining whether to allow a storage battery to be charged in the first time period based on the first predictive value for the first time period and previous information that is related to the first predictive value and obtained in a second time period before the first time period;

determining whether current charge-and-discharge plans and current information for multiple time periods, which include the first time period and subsequent time periods, are received at a start time of the first time period, the current charge-and-discharge plans indicating operations for controlling charging and discharging of the storage battery, and the current information being related to the current charge-and-discharge plans;

when the current charge-and-discharge plans and the current information are not received at the start time of the first time period, calculating predictive values of the total power consumption for the multiple time periods at the start time of the first time period;

determining whether a previous charge-and-discharge plan and the previous information that are for the first time period and obtained in the second time period are stored in a memory of the power-supply control apparatus;

determining whether the first predictive value for the first time period is largest in the predictive values calculated for the multiple time periods and a past predictive value of the total power consumption stored in the memory;

determining whether to allow the storage battery to be charged in the first time period based on whether the previous charge-and-discharge plan and the previous information are stored in the memory and whether the first predictive value is largest; and when the previous charge-and-discharge plan and the previous information are not stored in the memory and the first predictive value is not largest, causing the power from the power supply to bypass the storage battery and to be supplied directly to a load connected to the storage battery in the first time period.

2. The power-supply control apparatus as claimed in claim 1, wherein the process further includes when the current charge-and-discharge plans and the current information are received at the start time of the first time period, storing the current charge-and-discharge plans and the current information in the memory.

3. The power-supply control apparatus as claimed in claim 2, wherein the process further includes when the previous charge-and-discharge plan and the previous information are not stored in the memory and the first predictive value is largest, preventing the storage battery from being charged in the first time period.

4. The power-supply control apparatus as claimed in claim 3, wherein the process further includes when the previous charge-and-discharge plan and the previous information are stored in the memory and the first predictive value is not largest, calculating a corrected predictive value by correcting the first predictive value calculated at the start time of the first time period using the previous information obtained in the second time period.

5. The power-supply control apparatus as claimed in claim 4, wherein the previous information includes a total increase indicating an increase in the total power consumption from the first predictive value, the increase being caused when previous charge-and-discharge plans, which are for the first time period and obtained in the second time period, are executed by the power-supply control apparatus and the other power-supply control apparatuses in the first time period; and a total decrease indicating a decrease in the total power consumption from the first predictive value, the total decrease being caused when the previous charge-and-discharge plans are executed by the power-supply control apparatus and the other power-supply control apparatuses in the first time period.

6. The power-supply control apparatus as claimed in claim 5, wherein the process further includes determining whether the corrected predictive value for the first time period is largest in the predictive values calculated for the multiple time periods and the past predictive value stored in the memory;

determining whether the total increase is 0; and when the corrected predictive value is largest and the total increase is not 0, causing the power from the power supply to bypass the storage battery and to be supplied directly to the load connected to the storage battery in the first time period.

7. The power-supply control apparatus as claimed in claim 2, wherein the predictive values are calculated based on past values of the total power consumption stored in the memory and climate information input from an external source.

8. A method performed by a power-supply control apparatus, the method comprising:

calculating, for a first time period, a first predictive value of total power consumption by the power-supply control apparatus and one or more other power-supply control apparatuses to which power is supplied from a power supply;

determining whether to allow a storage battery to be charged in the first time period based on the first predictive value for the first time period and previous information that is related to the first predictive value and obtained in a second time period before the first time period;

determining whether current charge-and-discharge plans and current information for multiple time periods, which include the first time period and subsequent time periods, are received at a start time of the first time period, the current charge-and-discharge plans indicating operations for controlling charging and discharging of the storage battery, and the current information being related to the current charge-and-discharge plans;

when the current charge-and-discharge plans and the current information are not received at the start time of the first time period, calculating predictive values of the total power consumption for the multiple time periods at the start time of the first time period;

determining whether a previous charge-and-discharge plan and the previous information that are for the first time period and obtained in the second time period are stored in a memory of the power-supply control apparatus;

determining whether the first predictive value for the first time period is largest in the predictive values calculated for the multiple time periods and a past predictive value of the total power consumption stored in the memory; and determining whether to allow the storage battery to be charged in the first time period based on whether the previous charge-and-discharge plan and the previous information are stored in the memory and whether the first predictive value is largest; and when the previous charge-and-discharge plan and the previous information are not stored in the memory and the first predictive value is not largest, causing the power from the power supply to bypass the storage battery and to be supplied directly to a load connected to the storage battery in the first time period.

9. A non-transitory computer-readable storage medium storing a program that causes a power-supply control apparatus to execute a process comprising:

calculating, for a first time period, a first predictive value of total power consumption by the power-supply control apparatus and one or more other power-supply control apparatuses to which power is supplied from a power supply;

determining whether to allow a storage battery to be charged in the first time period based on the first predictive value for the first time period and previous information that is related to the first predictive value and obtained in a second time period before the first time period; and determining whether current charge-and-discharge plans and current information for multiple time periods, which include the first time period and subsequent time periods, are received at a start time of the first time period, the current charge-and-discharge plans indicating operations for controlling charging and discharging of the storage battery, and the current information being related to the current charge-and-discharge plans;

when the current charge-and-discharge plans and the current information are not received at the start time of the first time period, calculating predictive values of the total power consumption for the multiple time periods at the start time of the first time period;

determining whether a previous charge-and-discharge plan and the previous information that are for the first time period and obtained in the second time period are stored in a memory of the power-supply control apparatus;

determining whether the first predictive value for the first time period is largest in the predictive values calculated for the multiple time periods and a past predictive value of the total power consumption stored in the memory; and determining whether to allow the storage battery to be charged in the first time period based on whether the previous charge-and-discharge plan and the previous information are stored in the memory and whether the first predictive value is largest; and when the previous charge-and-discharge plan and the previous information are not stored in the memory and the first predictive value is not largest, causing the power from the power supply to bypass the storage battery and to be supplied directly to a load connected to the storage battery in the first time period.

10. A server connected to a plurality of power-supply control apparatuses, the server comprising:

a processor that executes a process including:

calculating, for multiple time periods, predictive values of total power consumption by the power-supply control apparatuses to which power is supplied from a power supply;

generating charge-and-discharge plans for the multiple time periods for each of the power-supply control apparatuses based on the calculated predictive values, the charge-and-discharge plans indicating operations to be performed by the power-supply control apparatuses to control charging and discharging of a storage battery;

calculating, for each of the multiple time periods, information including a total increase in the total power consumption and a total decrease in the total power consumption that are caused when the charge-and-discharge plans are executed by the power-supply control apparatuses in a corresponding one of the multiple time periods; and delivering the charge-and-discharge plans and the information for the multiple time periods to each of the power-supply control apparatuses causing at least one of the power-supply control apparatuses to determine whether current charge-and-discharge plans and current information for the multiple time periods, which include a first time period and subsequent time periods, are received at a start time of the first time period, the current charge-and-discharge plans indicating operations for controlling charging and discharging of the storage battery, and the current information being related to the current charge-and-discharge plans;

when the current charge-and-discharge plans and the current information are not received at the start time of the first time period, calculate predictive values of the total power consumption for the multiple time periods at the start time of the first time period;

determine whether a previous charge-and-discharge plan and the previous information that are for the first time period and obtained in the second time period are stored in a memory of the power-supply control apparatus;

determine whether the first predictive value for the first time period is largest in the predictive values calculated for the multiple time periods and a past predictive value of the total power consumption stored in the memory; and determine whether to allow the storage battery to be charged in the first time period based on whether the previous charge-and-discharge plan and the previous information are stored in the memory and whether the first predictive value is largest; and when the previous charge-and-discharge plan and the previous information are not stored in the memory and the first predictive value is not largest, causing the power from the power supply to bypass the storage battery and to be supplied directly to a load connected to the storage battery in the first time period.

11. A power-supply control system, comprising:
a server; and
a plurality of power-supply control apparatuses,
wherein the server includes a first processor that executes a first process including:

calculating, for multiple time periods, predictive values of total power consumption by the power-supply control apparatuses to which power is supplied from a power supply, generating charge-and-discharge plans for the multiple time periods for each of the power-supply control apparatuses based on the calculated predictive values, the charge-and-discharge plans indicating operations to be performed by the power-supply control apparatuses to control charging and discharging of a storage battery, calculating, for each of the multiple time periods, information including a total increase in the total power consumption and a total decrease in the total power consumption that are caused when the charge-and-discharge plans are executed by the power-supply control apparatuses in a corresponding one of the multiple time periods, and delivering the charge-and-discharge plans and the information for the multiple time periods to each of the power-supply control apparatuses; and wherein each of the power-supply control apparatuses includes a second processor that executes a second process including:

when a current charge-and-discharge plan for a first time period and current information related to the current charge-and-discharge plan are not received from the server at a start time of the first time period, calculating a first predictive value of the total power consumption for the first time period, determining whether to allow the storage battery to be charged in the first time period based on the first predictive value for the first time period and previous information that is related to the first predictive value and obtained in a second time period before the first time period;

determining whether current charge-and-discharge plans and current information for multiple time periods, which include the first time period and subsequent time periods, are received at a start time of the first time period, the current charge-and-discharge plans indicating operations for controlling charging and discharging of the storage battery, and the current information being related to the current charge-and-discharge plans;

when the current charge-and-discharge plans and the current information are not received at the start time of the first time period, calculating predictive values of the total power consumption for the multiple time periods at the start time of the first time period;

determining whether a previous charge-and-discharge plan and the previous information that are for the first time period and obtained in the second time period are stored in a memory of the power-supply control apparatus;

determining whether the first predictive value for the first time period is largest in the predictive values calculated for the multiple time periods and a past predictive value of the total power consumption stored in the memory;

determining whether to allow the storage battery to be charged in the first time period based on whether the previous charge-and-discharge plan and the previous information are stored in the memory and whether the first predictive value is largest; and when the previous charge-and-discharge plan and the previous information are not stored in the memory and the first predictive value is not largest, causing the power from the power supply to bypass the storage battery and to be supplied directly to a load connected to the storage battery in the first time period.

* * * * *